(12) United States Patent
Dahl et al.

(10) Patent No.: US 12,436,155 B2
(45) Date of Patent: Oct. 7, 2025

(54) PREECLAMPSIA SCREENING DEVICE AND METHODS MEASURING ACTIVIN AND/OR INHIBIN A

(71) Applicant: Kalia Health, Inc., Chapel Hill, NC (US)

(72) Inventors: Denali K. Dahl, Chapel Hill, NC (US); Brian Matovu, Kampala (UG); Zoe Sekyonda, Cleveland, OH (US)

(73) Assignee: KALIA HEALTH, INC., Chapel Hill, NC (US)

( * ) Notice: Subject to any disclaimer, the term of this patent is extended or adjusted under 35 U.S.C. 154(b) by 395 days.

(21) Appl. No.: 17/232,513

(22) Filed: Apr. 16, 2021

(65) Prior Publication Data
US 2021/0325400 A1 Oct. 21, 2021

Related U.S. Application Data

(60) Provisional application No. 63/011,167, filed on Apr. 16, 2020.

(51) Int. Cl.
*G01N 33/68* (2006.01)
*G01N 33/543* (2006.01)

(52) U.S. Cl.
CPC ..... *G01N 33/689* (2013.01); *G01N 33/54388* (2021.08); *G01N 2800/368* (2013.01)

(58) Field of Classification Search
None
See application file for complete search history.

(56) References Cited

U.S. PATENT DOCUMENTS

| | | | |
|---|---|---|---|
| 8,871,448 B2 | 10/2014 | Buhimschi et al. | |
| 9,250,251 B2 | 2/2016 | Nicolaides et al. | |
| 10,006,087 B2 | 6/2018 | Lo et al. | |
| 10,444,247 B2 | 10/2019 | Hurskainen et al. | |
| 2006/0067937 A1 | 3/2006 | Karumanchi et al. | |
| 2006/0166277 A1* | 7/2006 | Karumanchi | C12Q 1/6883 435/7.1 |
| 2013/0177901 A1 | 7/2013 | Darbouret et al. | |
| 2013/0230846 A1* | 9/2013 | Babu | G01N 33/5302 435/7.1 |
| 2018/0246115 A1 | 8/2018 | Garovic | |
| 2020/0141932 A1 | 5/2020 | Davis et al. | |

FOREIGN PATENT DOCUMENTS

| | | | | |
|---|---|---|---|---|
| WO | WO 95/32431 | * | 5/1995 | ............. G01N 33/74 |
| WO | WO 2017/181367 | * | 10/2017 | ............. G01N 33/68 |
| WO | WO 2017/197573 | * | 11/2017 | ............. G01N 33/68 |
| WO | WO-2017197573 A1 | * | 11/2017 | ............. G01N 33/689 |

OTHER PUBLICATIONS

Wu et al., European Review for Medical and Pharmacological Sciences (2015); 19: 4371-4378 (Year: 2015).*
Robertson et al., Mol and Cell Endo. 191 (2002) 97-103 (Year: 2002).*
Koczula, Essays in Biochemistry (2016) 60 111-120 (Year: 2016).*
Trevethan R. (2017) Front. Public Health 5:307. doi: 10.3389/fpubh. 2017.00307 (Year: 2017).*
Leon Gordis, "Assessing the Validity and Reliability of Diagnostic and Screening Tests" in Epidemiology, 2nd edition, 2000 WB Saunders, Chapter 4, pp. 63-81 (Year: 2000).*
Health sciences definition of "threshold", copied/pasted into the Office action, downloaded from: https://www.greenfacts.org/glossary/tuv/threshold.htm#:~:text=Definition%3A,National%20Safety%20Council%20Environmental%20Glossary (Year: 2023).*
Definition of "limit of detection", copied/pasted into the Office action, downloaded from: https://www.sciencedirect.com/topics/nursing-and-health-professions/limit-of-detection#:~:text=The%20limits%20of%20detection%20(LOD,of%20obtaining%20a%20correct%20result (Year: 2023).*
The definition of "threshold level" found at: https://www.oxfordreference.com/display/10.1093/oi/authority.20110803104449658), downloaded Feb. 20, 2024. (Year: 2024).*
Gasperino et al., Anal. Chem. 2018, 90, 6643-6650 (Year: 2018).*
Daponte et al., Disease Markers, 35; (2013): 497-503 (Year: 2013).*
Khalil et al., Clinical Endocrinology (2009) 70, 924-931 (Year: 2009).*
The English abstract by Lin (Shiyong Fuchanke Zazhi (2012), 28(7), 576-579) (Year: 2012).*
Anderson et al., "Fetal hemoglobin and alpha 1-micoglobulin as first—and early second-trimester predictive biomarkers for preeclampsia." American Journal of Obstetrics and Gynecology, vol. 204(6), p. 520. e1-520. e5. (2011).
Aquilina et al., "Second-trimester maternal serum inhibin A concentration as an early marker for preeclampsia." American Journal of Obstetrics and Gynecology, vol. 181(1), pp. 131-136 (1999).
Bearfield et al., "The secretion and effect of inhibin A, activin A and follistatin on first-trimester trophoblasts in vitro." European Journal of Endocrinology, vol. 152(6), pp. 909-916 (2005).
Carty et al., "Novel biomarkers for predicting preeclampsia." Trends in Cardiovascular Medicine, vol. 18(5), pp. 186-194 (2008).
Cnossen, J.S., et al., Are tests for predicting pre-eclampsia good enough to make screening viable? A review of reviews and critical appraisal. Acta obstetricia et gynecologica Scandinavica, 2009. 88(7): p. 758-765.
Conde-Agudelo, A., J. Villar, and M. Lindheimer, World Health Organization systematic review of screening tests for preeclampsia. Obstetrics & Gynecology, 2004. 104(6): p. 1367-1391.
De Kretser, D., et al., Inhibins, activins and follistatin in reproduction. Human reproduction update, 2002. 8(6): p. 529-541.

(Continued)

*Primary Examiner* — Christina M Borgeest
(74) *Attorney, Agent, or Firm* — Husch Blackwell LLP

(57) ABSTRACT

Provided are diagnostic and/or screening tests, assays and devices for preeclampsia (PE). The diagnostic and/or screening tests, assays and devices include test antibodies for activin A and/or inhibin A. The PE diagnostic and/or screening tests, assays and devices are capable of detecting activin A and/or inhibin A in a sample at a concentration of less than about 60 pg/mL. Corresponding methods of diagnosing and/or screening for PE are provided.

14 Claims, 9 Drawing Sheets

(56) References Cited

OTHER PUBLICATIONS

Florio et al., "Changes in inhibins and activin secretion in healthy and pathological pregnancies." Molecular and Cellular Endocrinology, vol. 180(1), pp. 123-130 (2001).

Florio et al., "Maternal serum inhibin A levels may predict pregnancy outcome in women with threatened abortion." Fertility and Sterility, vol. 81(2), pp. 468-470 (2004).

Gray, P.C., et al., Activins and inhibins: Physiological roles, signaling mechanisms and regulation, in Hormones and the Brain. 2005, Springer. p. 1-28.

Groome et al., "Detection of dimeric inhibin throughout the human menstrual cycle by two-site enzyme immunoassay." Clinical Endocrinology, vol. 40(6), pp. 717-723 (1994).

Hamar et al., "Serum and urine inhibin A but not free activin A are endocrine biomarkers of severe pre-eclampsia." vol. 195(6), pp. 1636-1645 (2006).

Khalil et al., Placental production and maternal serum and urine levels of inhibin A and activin A are modified by antihypertensive therapy in hypertensive disorders of pregnancy. Clinical Endocrinology, vol. 70(6), pp. 924-931 (2009).

Kuc, S., et al., Evaluation of 7 serum biomarkers and uterine artery Doppler ultrasound for first-trimester prediction of preeclampsia: a systematic review. Obstetrical & gynecological survey, 2011. 66(4): p. 225-239.

Lebrun et al., "Activin and inhibin have antagonistic effects on ligand-dependent heteromerization of the type I and type II activin receptors and human erythroid differentiation." Molecular and Cellular Biology, vol. 17(3), pp. 1682-1691 (1997).

Luisi et al., "Maternal serum inhibin A levels are a marker of a viable trophoblast in incomplete and complete miscarriage." European Journal of Endocrinology, vol. 148(2), pp. 233-236 (2003).

Massagué, J., TGF-β signal transduction. Annual review of biochemistry, 1998. 67(1): p. 753-791.

Muttukrishna et al., "Activin A and inhibin A as possible endocrine markers for pre-eclampsia." The Lancet, vol. 349(9061), pp. 1285-1288 (1997).

Muttukrishna et al., "Serum inhibin A and activin A are elevated prior to the onset of pre-eclampsia." Human Reproduction, vol. 15(7), pp. 1640-1645 (2000).

Muttukrishna et al., "Uterine vein and maternal urinary levels of activin A and inhibin A in pre-eclampsia patients." Clinical Endocrinology, vol. 64(4), pp. 469-473 (2006).

Schier, A.F. and M.M. Shen, Nodal signalling in vertebrate development. Nature, 2000. 403(6768): p. 385-389.

Silver et al., "Comparison of maternal serum total activin A and inhibin A in normal, preeclamptic, and nonproteinuric gestationally hypertensive pregnancies." American Journal of Obstetrics and Gynecology, vol. 180(5), pp. 1131-1137 (1999).

Wozney, J.M., et al., Novel regulators of bone formation: molecular clones and activities. Science, 1988. 242(4885): p. 1528-1534.

Wu, Pensée, et al. "Early pregnancy biomarkers in pre-eclampsia: a systematic review and meta-analysis." International journal of molecular sciences 16.9 (2015): 23035-23056.

Ying, S.-Y., Inhibins, activins, and follistatins: gonadal proteins modulating the secretion of follicle-stimulating hormone. Endocrine Reviews, 1988. 9(2): p. 267-293.

* cited by examiner

| Activin Concentration | Visible Test Signal | Visible Control Signal |
|---|---|---|
| 1000 | yes | yes |
| 250 | yes | yes |
| 200 | yes | yes |
| 62.5 | yes | yes |
| 40 | yes | yes |
| 8 | yes | yes |
| 1.6 | yes | yes |
| 1.56 | yes | yes |
| 0.39 | yes | yes |
| 0.32 | yes | yes |
| 0.064 | yes | yes |
| 0 | yes | yes |

Activin A positive and negative result examples

Inhibin A positive and negative result examples

PREECLAMPSIA SCREENING DEVICE AND METHODS MEASURING ACTIVIN AND/OR INHIBIN A

CROSS-REFERENCE TO RELATED APPLICATIONS

This application claims priority to and the benefit of U.S. Provisional Patent Application Ser. No. 63/011,167, filed Apr. 16, 2020, herein incorporated by reference in its entirety.

TECHNICAL FIELD

Provided herein are preeclampsia diagnostic devices, systems and methods. More particularly, provided are point-of-care diagnostic texts for preeclampsia and related conditions.

BACKGROUND

Globally, almost half of all women experience complications during pregnancy; however, 99% of maternal mortality occurs in low-resource settings. Despite being preventable, about 830 women around the world die each day from pregnancy or childbirth complications [1]. Preeclampsia and eclampsia are the second leading cause of maternal mortalities, meaning that over 76,000 women and about 500,000 babies die worldwide every year due to preeclampsia and eclampsia [2,3]. The World Health Organization (WHO) estimates that if 90% of pregnant women across Africa had access to the WHO recommended four prenatal care visits, the newborn and maternal mortality rate could be reduced by 14%. This translates to the prevention of 42,000 maternal deaths each year.

Preeclampsia is a complication in pregnancy that develops in birthing people during the last 20 weeks of their pregnancy and can result in serious or fatal complications for both mother and unborn child. Irregular formation of blood vessels in the placenta leads to preeclampsia, which is characterized by hypertension and damage to the organs in the mother's body. The early symptoms of preeclampsia include hypertension and increased proteinuria or excess protein in the urine of a pregnant person. Preeclampsia can be difficult to diagnose because many of the early symptoms are common factors in pregnancy or can indicate the onset of other pregnancy complications. Current diagnosis methods for preeclampsia include measuring blood pressure and using a dipstick to detect protein in the urine. Preeclampsia is defined by the new onset of hypertension (systolic 140 mmHg and/or diastolic blood pressure 90 mmHg) and proteinuria (2 on a dipstick or 24 h urine sample showing 300 mg/24 h or protein to creatinine ratio 0.3 mg/dl) or end-organ dysfunction after 20 weeks of gestation or postpartum. Additionally, increased proteinuria is sometimes not seen in patients with preeclampsia although other issues like kidney failure, impaired liver function, pulmonary edema, or cerebral symptoms combined with elevated blood pressure may indicate preeclampsia. Because of the subtlety of these symptoms, birthing people are often unaware of their complication. Unless they receive routine prenatal care, undiagnosed preeclampsia develops into a more severe complication like organ failure and death. The treatment for preeclampsia and eclampsia depends on the severity of the mother's condition. One of the recommendations in managing preeclampsia or eclampsia is to deliver the baby, but depending on the stage of pregnancy and the gestational development of the fetus, the baby may be too premature to survive. In these cases, routine monitoring, bed rest, medications such as antihypertensive and anticonvulsants, or hospitalization may be recommended for the mother to control disease complications until the baby is mature enough for delivery. In many resource-limited settings, the equipment necessary to care for premature infants is not readily available and so low birth weight neonates face high risks of hypothermia, developmental problems, and death. The ongoing mortality from preeclampsia and eclampsia exemplify the health disparity between high-income countries where birthing people have access to adequate prenatal care and low-income countries where birthing people routinely die from preventable causes.

Currently, no home-based early detection test for preeclampsia exists. Alternative solutions include improvements to clinical diagnosis, or birthing people not having access to early detection and suffering the severe and often fatal health effects. All of the clinical improvements operate with the assumption that birthing people are already at the clinic or healthcare facility to receive care, but from the ongoing mortality of preeclampsia and our understanding of the chain of care in resource-limited settings it becomes evident that this assumption is limited in addressing the scope of the problem since birthing people are not visiting healthcare facilities until preeclampsia has progressed to a severe stage.

The standard of diagnosis for preeclampsia is based on proteinuria and/or a blood pressure test. Both require a physician in a clinical setting. Additionally, the diagnoses are also subjective. There is currently no home-based or point-of-care diagnostic kit, assay or device for preeclampsia diagnostics. The present disclosure addresses this long-felt need.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, provided herein are diagnostic and/or screening tests for preeclampsia (PE), the diagnostic and/or screening tests comprising: a test antibody with an affinity to activin A and/or inhibin A; a control antibody with an affinity to IgG antibodies; and a detectable moiety configured to be detectable when activin A and/or inhibin A is present in a sample, wherein the detection of activin A and/or inhibin A in the sample indicates preeclampsia. In some aspects, the diagnostic and/or screening comprises test antibodies for both activin A and inhibin A, wherein the diagnostic and/or screening test is configured to test or screen for the presence of both activin A and inhibin A simultaneously. The diagnostic and/or screening test can be configured in a lateral-flow immunoassay format.

In some aspects, the diagnostic and/or screening tests can detect activin A and/or inhibin A in a sample at a concentration of less than about 500 pg/mL, optionally at a concentration of less than about 120 pg/mL, optionally at a concentration of less than about 100 pg/mL. The diagnostic and/or screening tests can detect activin A and/or inhibin A in a sample at a concentration of less than about 60 pg/mL. In some embodiments, the diagnostic and/or screening tests can detect activin A and/or inhibin A in a sample with a specificity of about 75% or greater and a sensitivity of about 50% or greater, optionally, a specificity of about 90% or greater and a sensitivity of about 60% or greater. The diagnostic and/or screening tests can detect activin A and inhibin A simultaneously in a sample, with a specificity of about 80% to about 95% and sensitivity of about 50% to about 60% for activin A, and specificity of about 70% to about 89% and sensitivity of about 60% to about 70% for inhibin A.

In some aspects, the diagnostic and/or screening tests can detect activin A and/or inhibin A in a sample, as well as at least one other PE biomarker selected from the group consisting of placental protein 13 (PP13), Soluble fms-like tyrosine kinase 1 (sFlt-1), placental growth factors (PlGF), soluble endoglin (sEng) and tissue inhibitor of metalloprotease 1 (TIMP-1). The diagnostic and/or screening test can be configured as a point-of-care diagnostic and/or screening test. In some embodiments, the diagnostic and/or screening tests can be configured to detect and/or screen for activin A and/or inhibin A in a sample. The sample can be a urine sample from a human subject.

Provided in some embodiments are diagnostic and/or screening apparatuses for preeclampsia, the diagnostic and/or screening apparatuses comprising: a chromatography matrix; a detection antibody with binding affinity to activin A and/or inhibin A; a detectable marker conjugated to the detection antibody; and a capture antibody with binding affinity to activin A, and/or a capture antibody with binding affinity to inhibin A, wherein the diagnostic or screening test is configured as a lateral-flow immunoassay, and wherein the diagnostic or screening test is configured to detect activin A and/or inhibin A in a sample from a subject to diagnose and/or screen for preeclampsia. The detection antibodies can have a binding affinity to activin A and inhibin A, and the capture antibodies have a binding affinity to activin A and inhibin A. The detection and/or capture antibodies can be monoclonal antibody (mAb) and/or polyclonal antibody (pAb). The detectable marker can be an enzyme label, fluorescent label, radiolabel, particulate label, colored latex particle, colored plastic particle, and a phosphor particle, colloidal gold nanoparticles, monodisperse latex combined with detector reagents such as colored dyes, fluorescent dyes, and magnetic or paramagnetic components. The apparatus can be configured to qualitatively and/or quantitatively detect and/or measure activin A and/or inhibin A in a human urine sample. The detection antibody can be chemically conjugated to the detectable marker to form a permanent, irreversible antibody-marker complex.

In some embodiments, the diagnostic and/or screening apparatus can detect activin A and/or inhibin A in a sample at a concentration of less than about 500 pg/mL, optionally at a concentration of less than about 120 pg/mL, optionally at a concentration of less than about 100 pg/mL. In some aspects, the diagnostic and/or screening apparatus detects activin A and/or inhibin A in a sample at a concentration of less than about 60 pg/mL. The diagnostic and/or screening apparatus detects activin A and/or inhibin A in a sample with a specificity of about 75% or greater and a sensitivity of about 50% or greater, optionally, a specificity of about 90% or greater and a sensitivity of about 60% or greater. The diagnostic and/or screening apparatus detects activin A and inhibin A simultaneously in a sample, with a specificity of about 80% to about 95% and sensitivity of about 50% to about 60% for activin A, and specificity of about 70% to about 89% and sensitivity of about 60% to about 70% for inhibin A. In some aspects, the diagnostic and/or screening apparatus is configured to detect activin A and/or inhibin A in a sample, as well as at least one other PE biomarker selected from the group consisting of placental protein 13 (PP13), Soluble fms-like tyrosine kinase 1 (sFlt-1), placental growth factors (PlGF), soluble endoglin (sEng) and tissue inhibitor of metalloprotease 1 (TIMP-1).

Also provided herein in some embodiments are point-of-care (POC) immunoassay devices comprising a chromatography matrix; a sample pad; a conjugate pad; a detection antibody with binding affinity to activin A and/or inhibin A; a detectable marker conjugated to the detection antibody; one or more capture antibodies, wherein the capture antibodies have a binding affinity to activin A and/or inhibin A; and a wicking pad, wherein the device is configured to detect activin A and/or inhibin A in a sample from a subject to diagnose or screen for preeclampsia at the point-of-care or in a field setting. The POC immunoassay comprises detection antibodies with binding affinity to activin A and inhibin A, and one or more capture antibodies with a binding affinity to activin A and inhibin A. The POC immunoassay is configured as a lateral-flow immunoassay. In some aspects the device can further comprise a housing configured to substantially enclose the chromatography matrix, sample pad, conjugate pad, detection antibody, capture antibodies and wicking pad, optionally in a disposable one-time use package. In some aspects the device can further comprise a sample receiving area configured to receive a sample and a test window configured to allow observation of test results. The wicking pad is configured to cause a sample to migrate in a lateral direction from the sample pad to the wicking pad by capillary action.

In some embodiments, the device detects activin A and/or inhibin A in a sample at a concentration of less than about 500 pg/mL, optionally at a concentration of less than about 120 pg/mL, optionally at a concentration of less than about 100 pg/mL. The device detects activin A and/or inhibin A in a sample at a concentration of less than about 60 pg/mL. The device detects activin A and/or inhibin A in a sample with a specificity of about 75% or greater and a sensitivity of about 50% or greater, optionally, a specificity of about 90% or greater and a sensitivity of about 60% or greater. The device detects activin A and inhibin A simultaneously in a sample, with a specificity of about 80% to about 95% and sensitivity of about 50% to about 60% for activin A, and specificity of about 70% to about 89% and sensitivity of about 60% to about 70% for inhibin A. The device is configured to detect activin A and/or inhibin A in a sample, as well as at least one other PE biomarker selected from the group consisting of placental protein 13 (PP13), Soluble fms-like tyrosine kinase 1 (sFlt-1), placental growth factors (PlGF), soluble endoglin (sEng) and tissue inhibitor of metalloprotease 1 (TIMP-1).

In some embodiments, provided herein are methods for screening a patient sample for an indication of preeclampsia, the method comprising: providing a sample from a patient; providing the diagnostic or screening test, device or apparatus of any of the above claims; administering the sample to the test, device or apparatus; and observing the absence or presence of the detectable marker to determine whether the sample contains activin A and/or inhibin A. In some embodiments, such methods are configured to qualitatively and/or quantitatively detect and/or measure human activin A and/or inhibin A in a human urine sample. In such methods the presence of activin A and/or inhibin A in the sample indicates that the patient has preeclampsia or is susceptible to developing preeclampsia, optionally, wherein the presence of activin A and/or inhibin A is detected at a level of about 100 pg/mL or less.

Objects of the presently disclosed subject matter having been stated above, other objects and advantages of the presently disclosed subject matter will become apparent to those skilled in the art after a study of the following description, Drawings and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter. For a more complete understanding of the presently disclosed subject matter, reference is now made to the following drawings in which:

DETAILED DESCRIPTION

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

Overview of the Presently Disclosed Subject Matter

Disclosed herein are preeclampsia diagnostic devices, systems and methods designed to assist patients in Early Preeclampsia Detection (EPED), also referred to as KAL-PDx. More particularly, in some embodiments disclosed herein are EPED test devices, including urine-based, point-of-care, early detection test strips that can be used by birthing people at home, or any point-of-care (POC) location, during pregnancy to self-screen for preeclampsia. The EPED test devices will assist birthing people and their caregivers in knowing when to seek medical care. By seeking medical care at the early onset of preeclampsia the condition can be appropriately monitored and controlled, thereby potentially reducing the detrimental health impacts of undiagnosed preeclampsia and/or eclampsia.

Generally, in some embodiments the disclosed EPED test strips and related devices/components can function by applying urine to one end of the strip and/or device, which is pulled across the strip by a wicking action where antibodies are immobilized. Using an immunoassay approach the strip can give the user a binary output, where a positive result is indicative of the development of complications associated with preeclampsia, and where a negative result is indicative of a normal pregnancy with no signs of preeclampsia.

In some embodiments, the presently disclosed EPED devices, systems and methods are based on the understanding that during the early onset of preeclampsia the concentration of certain biomarker proteins increase in the urine of pregnant people. As such, in some embodiments the disclosed EPED devices, systems and methods are configured to detect such biomarkers for EPED. In some embodiments, and by way of example and not limitation, the disclosed EPED devices, systems and methods can be configured to utilize a lateral flow immunoassay to detect biomarkers in a patient sample.

In some aspects, the benefits of the disclosed EPED devices and strips can include, for example, safety, affordability, reliability, point-of-care usability and early detection of preeclampsia, each of which can provide birthing people with the tools needed to take ownership of their own health during pregnancy.

Figure 1:
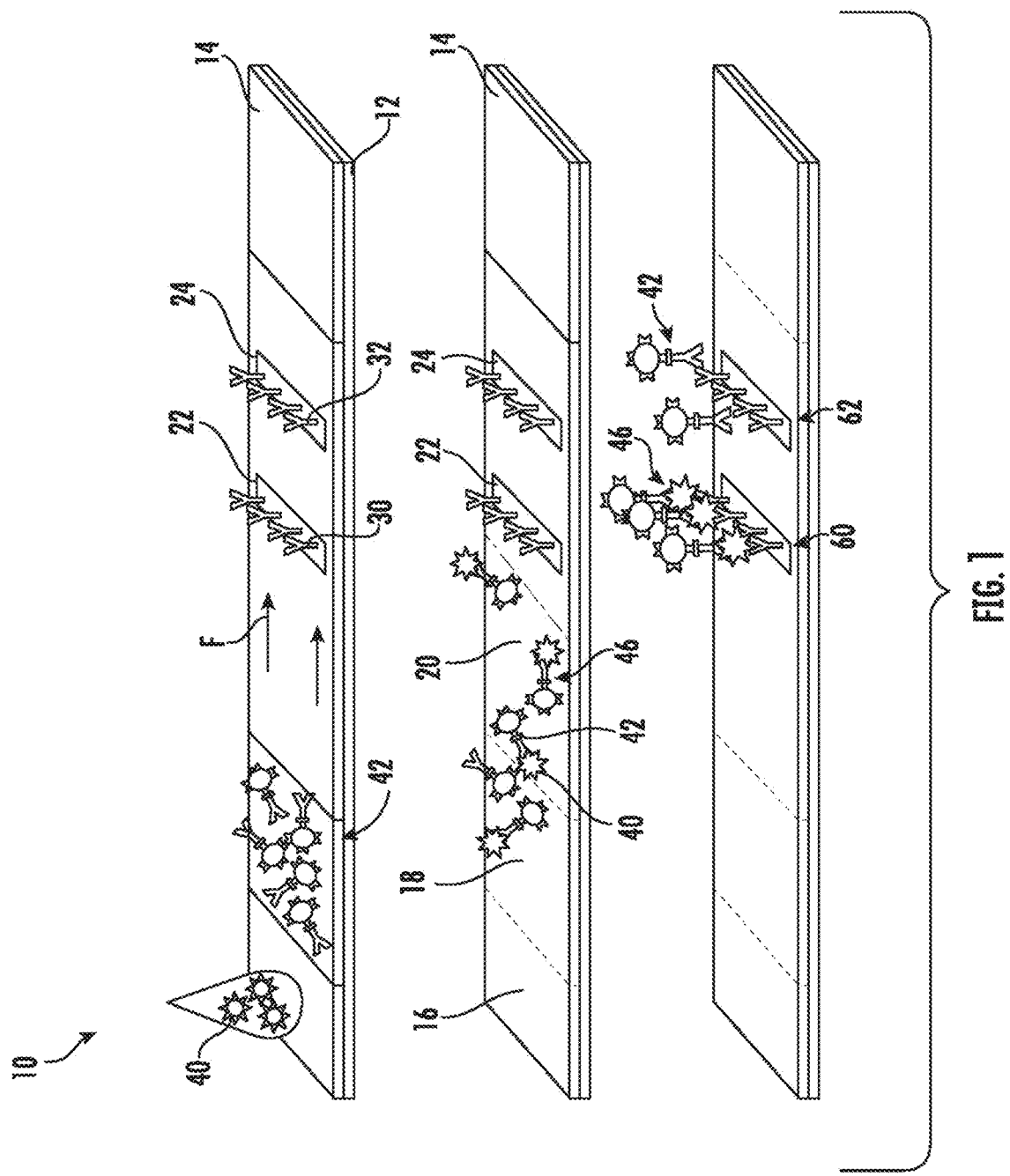
FIG. 1 is a schematic illustration of a lateral flow immunoassay of the presently disclosed subject matter.

The presently disclosed EPED devices, systems and methods can in some aspects be configured to comprise a lateral flow assay (LFA) or lateral flow immunoassay (LFIA), including for example that which is shown in FIG. 1.

Referring to FIG. 1, in some embodiments, LFA or LFIA 10, can comprise a substrate 12 upon which membrane 20, i.e. a chromatography matrix, is applied. LFIA 10 can further comprise a wicking pad 14, a sample pad 16, and a conjugate pad 18. One or a plurality of test 22 or control lines 24 can be included on membrane 20, where test line 22 can include immobilized capture antibodies 30 with a specificity or binding activity against a target or biomarker of interest, e.g. inhibin A or activin A, and the control line 24 can include immobilized antibodies 32 with an affinity for anti-IgG or other control target in the sample. A plurality of antibody conjugates 42 can be immobilized on conjugate pad 18, with the antibody conjugates 42 comprising an antibody against the target or biomarker conjugated to a detectable moiety or particle, e.g. gold nanoparticle.

Referring to FIG. 1, in some embodiments, LFA or LFIA 10, as can be utilized in the disclosed EPED devices, systems and methods, function by first applying a small amount of liquid sample with biomarker 40, e.g. inhibin A or activin A (if present), to the sample pad 16. The liquid sample can be pulled across the strip via the wicking pad 14 by capillary action or capillary flow F. As the liquid crosses the conjugate pad 18 where antibody conjugates 42 have been immobilized, the sample and biomarker 40 interacts with the antibody conjugates 42 to form the detectable biomarker 46 which then migrates to the test 22 and control 24 lines, There can in some embodiments be two lines, a test line 22 and a control line 24. If biomarker 40 is present capture antibodies 30 will capture the detectable biomarker 46 and become visible or detectable. The presence or absence, or visibility of the control and test lines indicate the presence or absence of the captured conjugate or biomarker. A positive test 60 and/or positive control 62 will be visible or detectable.

In some embodiments, the disclosed EPED devices, systems and methods can comprise two test lines in an LFA or LFIA format, including for example one test line (also referred to as a first test line) to detect activin A, and another test line (also referred to as a second test line) to detect inhibin A. Moreover, in some embodiments, to create the test strip, conjugated gold nanoparticles can be used as receptors. The components can be sprayed onto a cellulose membrane and allowed to dry. After the strips have been assembled, the effectiveness of the strip to detect different levels of proteins can be verified and calibrated to detect specific and/or desired levels of activin A and/or inhibin A.

Activin A and inhibin A are glycoproteins which belong to the transforming growth factor $\beta$ (TGF-$\beta$) superfamily, which also includes the TGF-$\beta$[5], bone morphogenetic protein (BMP) [6], growth and differentiation (GDF) and nodal-related families [7]. These proteins show disulphide-linked dimers, which share a common $\alpha$-subunit and differ on the basis of a $\beta$-subunit termed $\beta$A in inhibin A ($\alpha\beta$A) and $\beta$B in inhibin B ($\alpha\beta$B). Inhibins are heterodimer proteins consisting of $\alpha\beta$A (inhibin A) and $\alpha\beta$B (inhibin B) subunits whereas activins are homodimers consisting of $\beta$A$\beta$A (activin A), $\beta$A$\beta$B (activin AB), and $\beta$B$\beta$B (activin B) subunits linked by disulphide bridges. The $\alpha$ subunit may be present in the precursor form when the mature $\alpha$C is extended by $\alpha$N, by a prosequence, or by both together [8,9]. These subunits can exist as a monomer or combine with the $\beta$ subunit ($\beta$A or $\beta$B) to form the pro$\alpha$C containing inhibin [10].

To elaborate, the test strip can in some embodiments comprise a base or substrate including nitrocellulose, fiberglass pads, and cellulose sample and absorbent pads. The backing can in some aspects comprise semi-rigid plastic, pressure-sensitive adhesive, and release liner. Most common plastics used for LFIA are polystyrene, vinyl (polyvinylchloride or PVC), and polyester. Custom materials are also available from component suppliers like G&L Precision Die Cutting (San Jose, California), Millipore, Inc. (Billerica, Massachusetts), Adhesive Research, Inc. (Glen Rock, Pennsylvania), and Whatman Inc. (Florham Park, New Jersey). By way of example and not limitation, thicknesses for the backing are usually: 0.005 in for polyester, 0.010 in for polystyrene, polyester, and vinyl, 0.015 in for polystyrene and vinyl.

By way of example and not limitation, other potential biomarkers can in some embodiments include: adipsin, placental growth factor, soluble fms-like tyrosine kinase, vascular endothelial growth factor, tamm-horsfall protein, SERine Protease-inhibitor A1, C5b-9 (4).

In some embodiments, provided herein are methods to develop and optimize an EPED device and system, including for example:
Identify and test antibody candidates for activin A and inhibin A;
Determine appropriate antibody conjugates;
Test assay with synthetic urine sample;
Test assay with fresh urine samples; and
Fabricate functional test strips using an LFA platform.

Such methods can provide for the manufacturing of devices at low cost and scalability. LFA-based test devices and assays also require minimal operator-dependent steps or interpretation and can be stable for up to two years without refrigeration. Other forms of rapid diagnostic tests like microfluidics, biosensors, and multiplexed arrays require long development cycles, specific market selection and education, and large investments in technology development infrastructure.

As such, in some embodiments, provided herein is a diagnostic and/or screening test for preeclampsia, the diagnostic and/or screening test comprising a test antibody with an affinity to activin A and/or inhibin A, a control antibody. The control line typically comprises a species-specific anti-immunoglobulin antibody, specific for the antibody in the particulate conjugate. In some embodiments, by way of example but not limitation, anti-activin A and anti-inhibin A antibodies can be used for the test line and anti-rabbit IgG antibodies (or another animal) for the control line.

In some aspects, the diagnostic and/or screening comprises test antibodies for both activin A and inhibin A, wherein the diagnostic and/or screening test is configured to test or screen for the presence of both activin A and inhibin A simultaneously. The diagnostic and/or screening test can detect activin A and/or inhibin A in a sample at a concentration of less than about 500 pg/mL, optionally at a concentration of less than about 120 pg/mL, optionally at a concentration of less than about 100 pg/mL. In some aspects, the diagnostic and/or screening test detects activin A and/or inhibin A in a sample at a concentration of less than about 100, 95, 90, 85, 80, 75, 70, 65, 60, 55, 50, 45, 40, 35, 30 or 25 pg/mL or less. In some aspects, the diagnostic and/or screening test detects activin A and/or inhibin A in a sample at a concentration of less than about 64 pg/mL or less.

In some embodiments, the diagnostic and/or screening test detects activin A and/or inhibin A in a sample with a specificity of about 75% or greater and a sensitivity of about 50% or greater, optionally, a specificity of about 90% or greater and a sensitivity of about 60% or greater. The diagnostic and/or screening tests can detect activin A and inhibin A simultaneously in a sample, with a specificity of about 80% to about 95% and sensitivity of about 50% to about 60% for activin A, and specificity of about 70% to about 89% and sensitivity of about 60% to about 70% for inhibin A. In some aspects, the diagnostic and/or screening tests can detect activin A and inhibin A simultaneously in a sample, with a specificity of about 50% to about 99%, 65% to about 98%, 75% to about 95%, or 80% to about 95%, and sensitivity of about 40% to about 80%, 45% to about 70%, or 50% to about 60%, for activin A, and specificity of about 50% to about 99%, 60% to about 95%, or 70% to about 89%, and sensitivity of about 50% to about 80%, 55% to about 75%, or 60% to about 70% for inhibin A.

In some embodiments, the diagnostic and/or screening tests can detect activin A and/or inhibin A in a sample, as well as at least one other PE biomarker selected from the group consisting of placental protein 13 (PP13), Soluble fms-like tyrosine kinase 1 (sFlt-1), placental growth factors (PlGF), soluble endoglin (sEng) and tissue inhibitor of metalloprotease 1 (TIMP-1).

The diagnostic and/or screening test can be configured in a lateral-flow immunoassay format, and can be configured as a point-of-care diagnostic and/or screening test. In some aspects, the diagnostic and/or screening test can be configured to detect and/or screen for activin A and/or inhibin A in a sample, where the sample can be a urine sample from a human subject.

Also provided herein is a diagnostic and/or screening apparatus for preeclampsia, the diagnostic and/or screening test comprising a chromatography matrix, a detection antibody with binding affinity to activin A and/or inhibin A, a detectable marker conjugated to the detection antibody, a capture antibody with binding affinity to activin A, and a capture antibody with binding affinity to inhibin A, wherein the diagnostic or screening test is configured as a lateral-flow immunoassay, and wherein the diagnostic or screening test is configured to detect activin A and/or inhibin A in a sample from a subject to diagnose or screen for preeclampsia. In some aspects the detection and/or capture antibodies are monoclonal antibody (mAb) and/or polyclonal antibody (pAb). In some aspects the detectable marker comprises gold. In some aspects the detectable marker is an enzyme label, fluorescent label, radiolabel, particulate label, colored latex particle, colored plastic particle, and a phosphor particle. In some embodiments the apparatus is configured to qualitatively and/or quantitatively detect and/or measure activin A and/or inhibin A in a human urine sample. In some embodiments the detection antibody is chemically conjugated to the detectable marker to form a permanent, irreversible antibody-marker complex.

Also provided herein is a point-of-care (POC) immunoassay device comprising a chromatography matrix, a sample pad, a conjugate pad, a detection antibody with binding affinity to activin A and/or inhibin A, a detectable marker conjugated to the detection antibody, one or more capture antibodies, wherein the capture antibodies have a binding affinity to activin A and/or inhibin A, and a wicking pad, wherein the device is configured to detect activin A and/or inhibin A in a sample from a subject to diagnose or screen for preeclampsia at the point-of-care or in a field setting. In some aspects, the POC immunoassay is configured as a lateral-flow immunoassay. In some aspects, the immunoassay further comprises a housing configured to substantially enclose the chromatography matrix, sample pad, conjugate pad, detection antibody, capture antibodies and wicking pad, optionally in a disposable one-time use package. In some aspects, the immune assay further comprises a sample receiving area configured to receive a sample and a test window configured to allow observation of test results. In some aspects, the wicking pad is configured to cause a sample to migrate in a lateral direction from the sample pad to the wicking pad by capillary action.

The diagnostic tests and devices disclosed herein can in some embodiments be configured as a LFIA, but can alternatively in some aspects be configured in a micro-fluidic, paper chromatography or other similar configuration conducive to effective diagnostics in a POC format.

Finally, in some embodiments, provided herein is a method for screening a patient sample for an indication of preeclampsia, the method comprising: providing a sample from a patient, providing the diagnostic or screening test, device or apparatus of any of the above claims, administering the sample to the test, device or apparatus, and observing the absence or presence of the detectable marker to determine whether the sample contains activin A and/or inhibin A. In some aspects the method is configured to qualitatively and/or quantitatively detect and/or measure human activin A and/or inhibin A in a human urine sample, wherein presence of activin A and/or inhibin A in the sample indicates that the patient has preeclampsia or is susceptible to developing preeclampsia.

In addition to inhibin A and activin A, other biomarkers can in some embodiments be used to screen for and/or diagnose PE. Such biomarkers can include, for example placental protein 13 (PP13). PP13 decreases in women with PE (52 pg/ml control, 33 pg/ml with severe PE). Soluble fms-like tyrosine kinase 1 (sFlt-1), also known as sVEGFR-1), and placental growth factors (PIGF) are other suitable biomarkers. Furthermore, soluble endoglin (sEng) and tissue inhibitor of metalloprotease 1 (TIMP-1) are others. In some embodiments one or more of these biomarkers for PE can be used in conjunction with activin A and/or inhibin A in the disclosed PE diagnostic and screening tests and methods.

Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a device" includes a plurality of such devices, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the terms "antibody" and "antibodies" refer to proteins comprising one or more polypeptides substantially encoded by immunoglobulin genes or fragments of immunoglobulin genes. The presently disclosed subject matter also includes functional equivalents of the antibodies of the presently disclosed subject matter. As used herein, the phrase "functional equivalent" as it refers to an antibody refers to a molecule that has binding characteristics that are comparable to those of a given antibody. In some embodiments, chimerized, humanized, and single chain antibodies, as well as fragments thereof, are considered functional equivalents of the corresponding antibodies upon which they are based. In some embodiments, the presently disclosed subject matter provides methods, compositions and apparatuses for detecting and/or diagnosing hemoglobinopathies, wherein one or more antibodies can be used directly, or in assays related thereto.

The term "substantially identical", as used herein to describe a degree of similarity between nucleotide sequences, peptide sequences and/or amino acid sequences refers to two or more sequences that have in one embodiment at least about least 60%, in another embodiment at least about 70%, in another embodiment at least about 80%, in another embodiment at least about 85%, in another embodiment at least about 90%, in another embodiment at least about 91%, in another embodiment at least about 92%, in another embodiment at least about 93%, in another embodiment at least about 94%, in another embodiment at least about 95%, in another embodiment at least about 96%, in another embodiment at least about 97%, in another embodiment at least about 98%, in another embodiment at least about 99%, in another embodiment about 90% to about 99%, and in another embodiment about 95% to about 99% nucleotide identity, when compared and aligned for maximum correspondence, as measured using a sequence comparison algorithm or by visual inspection.

As used herein, the terms "detectable moiety", "detectable label", and "detectable agent" refer to any molecule that can be detected by any moiety that can be added to a antigen, inhibitor, marker, reagent and/or antibody, or a fragment or derivative thereof, that allows for the detection of the antigen, inhibitor, marker, reagent and/or antibody, fragment, or derivative in vitro and/or in vivo. Representative detectable moieties include, but are not limited to, gold nanoparticles, dyes, an enzyme label, fluorescent label, radiolabel, particulate label, colored latex particle, colored plastic particle, and a phosphor particle, colloidal gold nanoparticles, monodisperse latex combined with detector reagents such as colored dyes, fluorescent dyes, and magnetic or paramagnetic components, chromophores, fluorescent moieties, radioactive labels, affinity probes, enzymes, antigens, groups with specific reactivity, chemiluminescent moieties, and electrochemically detectable moieties, etc. In some embodiments, the antibodies are biotinylated.

The subject(s) screened, tested, or from which a sample is taken, is desirably a human subject, although it is to be understood that the principles of the disclosed subject matter indicate that the compositions, apparatuses and methods are effective with respect to invertebrate and to all vertebrate species, including mammals, which are intended to be included in the term "subject". Moreover, a mammal is understood to include any mammalian species in which screening is desirable, particularly agricultural and domestic mammalian species.

The disclosed devices, compositions, apparatuses and methods are particularly useful in the testing, screening and/or treatment of warm-blooded vertebrates, including human females. Thus, the presently disclosed subject matter can in some embodiments concern mammals and birds.

More particularly, provided herein is the testing, screening and/or treatment of mammals such as humans, as well as those mammals of importance due to being endangered (such as Siberian tigers), of economic importance (animals raised on farms for consumption by humans) and/or social importance (animals kept as pets or in zoos) to humans, for instance, carnivores other than humans (such as cats and dogs), swine (pigs, hogs, and wild boars), ruminants (such as cattle, oxen, sheep, giraffes, deer, goats, bison, and camels), and horses. Also provided is the treatment of birds, including the treatment of those kinds of birds that are endangered, kept in zoos, as well as fowl, and more particularly domesticated fowl, i.e., poultry, such as turkeys, chickens, ducks, geese, guinea fowl, and the like, as they are also of economic importance to humans. Thus, provided herein is the treatment of livestock, including, but not limited to, domesticated swine (pigs and hogs), ruminants, horses, poultry, and the like.

In some embodiments, the subject to be used in accordance with the presently disclosed subject matter is a subject in need of treatment and/or diagnosis. In some embodiments, a subject can be a pregnant female human subject believed to have or be susceptible to preeclampsia.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

A pilot study was conducted at Mulago National Referral Hospital in Kampala, Uganda. The case-control study involved 80 women. Activin A and inhibin A demonstrated statistically significant difference in terms of concentration levels between women who had normal pregnancies vs. women who were clinically diagnosed as preeclamptic or eclamptic. The approximate threshold value for each biomarker was determined. Further details are provided in Example 2 (activin A) and Example 3 (inhibin A).

Example 2

Figure 2A:
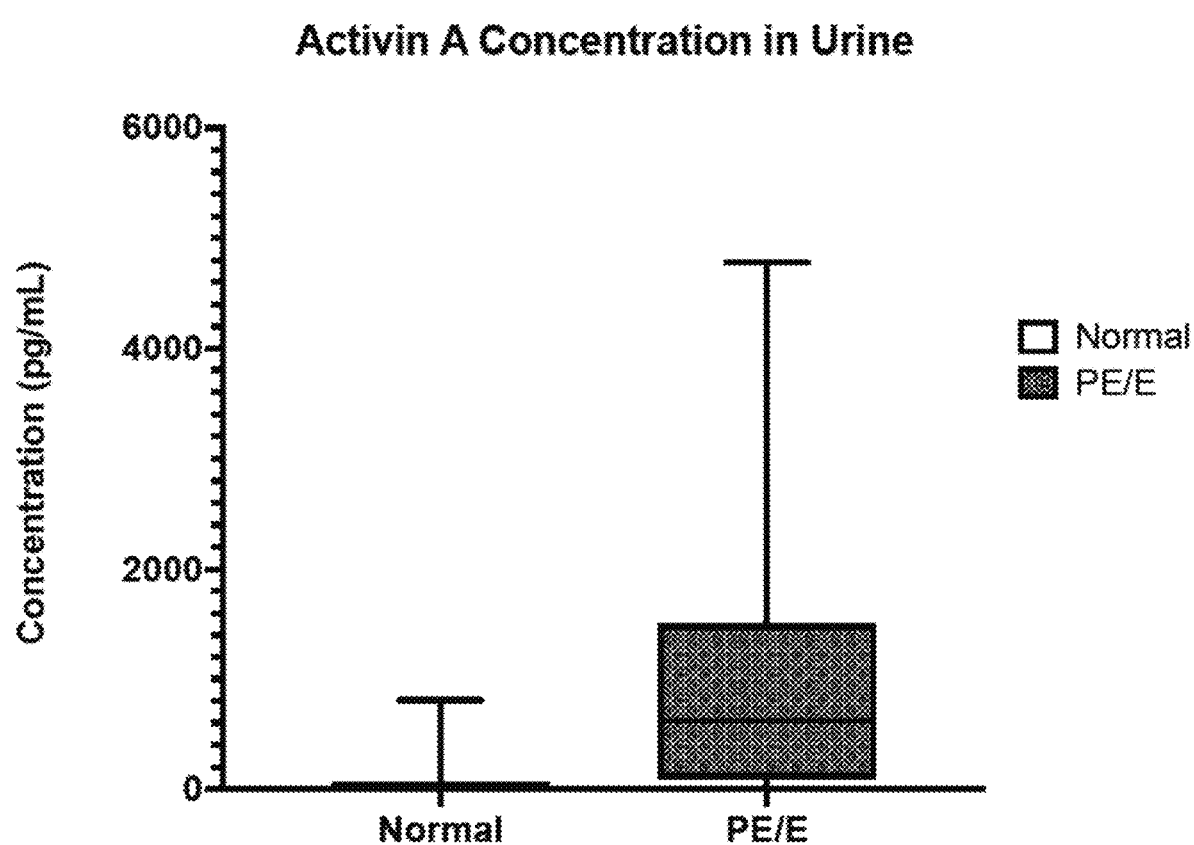
FIGS. 2A-2C are graphical depictions of the data from studies evaluating the concentration of activin A in normal versus preeclamptic/eclamptic women (FIGS. 2A and 2B), and the ROC curve of Activin A for determination of a diagnostic range (FIG. 2C).

For activin A, FIG. 2A shows the comparison of mean values for the concentration of activin A in normal pregnancies as compared to preeclamptic/eclamptic pregnancies. The values are statistically different with the average case concentrations values being about 10 fold higher. See FIG. 2A and Table 1.

Figure 2B:
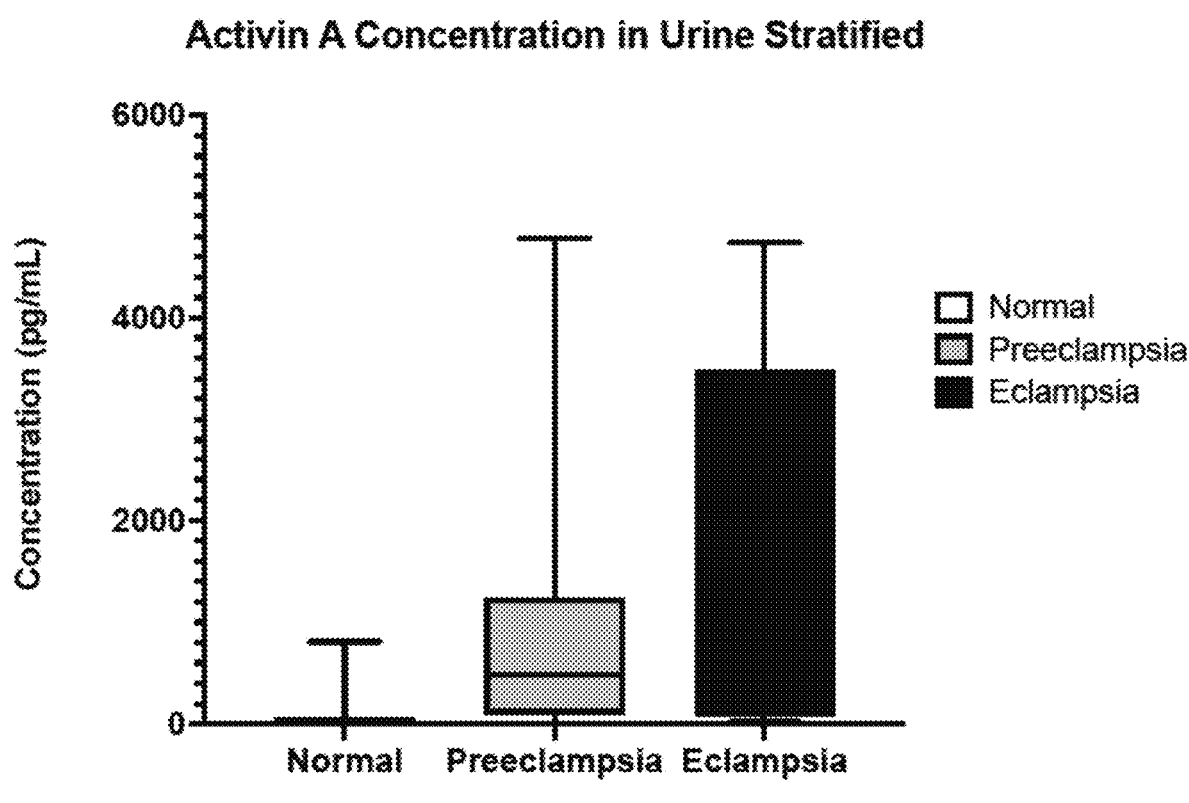

The case groups were also stratified to examine at the difference between preeclampsia and eclampsia (FIG. 2B; Table 2). The range of biomarker concentration in the cases with eclampsia was about twice as high as the cases of preeclampsia.

TABLE 1

| Clinical Diagnosis | Average Concentration of Activin A (pg/mL) |
| --- | --- |
| Control (Normal Pregnancy) | 93.93 |
| Case (Preeclampsia/Eclampsia) | 1004.66 |

TABLE 2

| Clinical Diagnosis | Average Concentration of Activin A (pg/mL) |
| --- | --- |
| Normal Pregnancy | 93.93 |
| Preeclampsia | 807.10 |
| Eclampsia | 1641.26 |

Figure 2C:
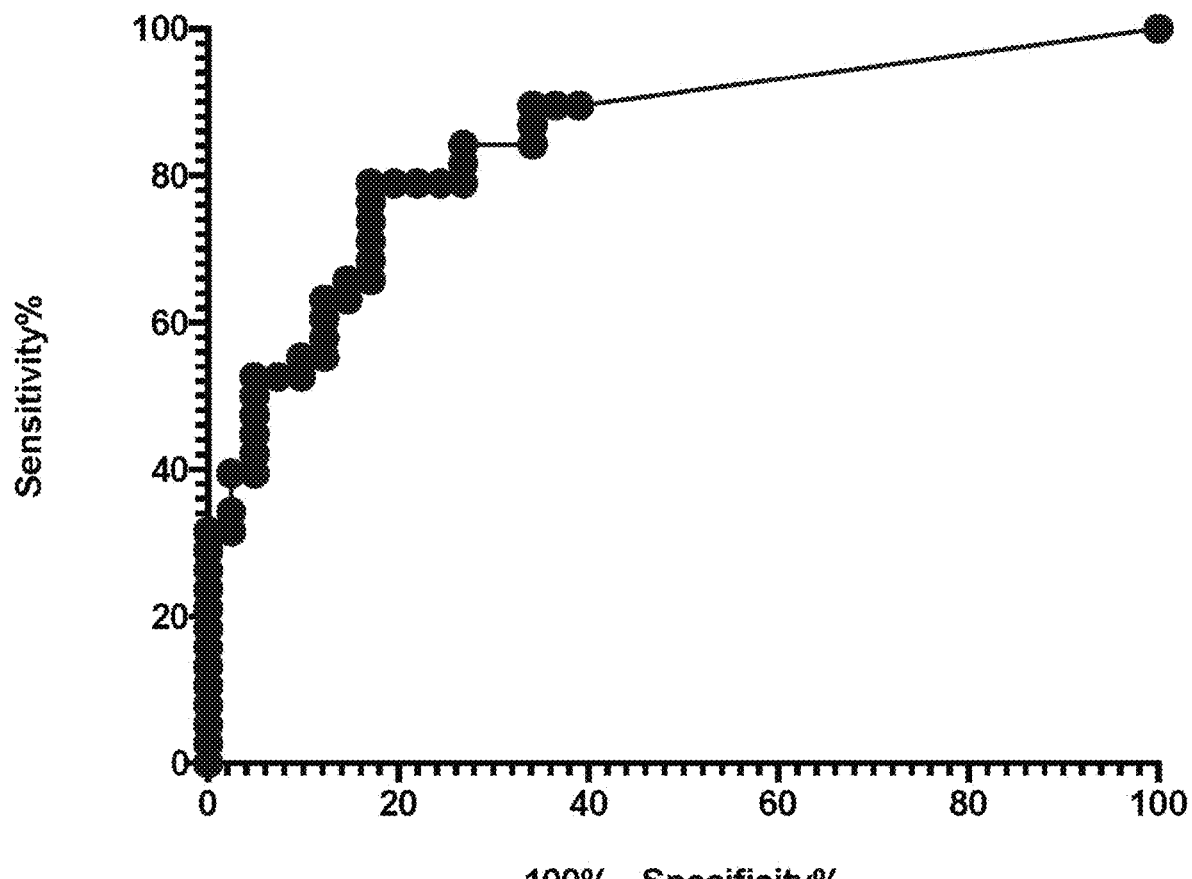

Next, the Receiver operating characteristics, or ROC, was plotted as concentration of activin A varies in urine to determine the sensitivity and specificity for different threshold values (FIG. 2C). This allows for determining a threshold value that optimizes both sensitivity and specificity (Table 3). When translated onto a urine-based assay, this can provide a binary result, where above that threshold value is indicative of preeclampsia or eclampsia, and below that value is indicative of a negative concentration.

TABLE 3

| Threshold Concentration (pg/mL) | Sensitivity % | Specificity % |
| --- | --- | --- |
| >24.50 | 89.47 | 65.85 |
| >40.33 | 84.21 | 73.17 |
| >435.3 | 55.26 | 90.24 |

Table 3 shows an example for how the threshold value can be adjusted to optimize the sensitivity and specificity. For example, in some embodiments at least 90% sensitivity/specificity for diagnostic purposes can be ideal.

Example 3

Figure 3A:
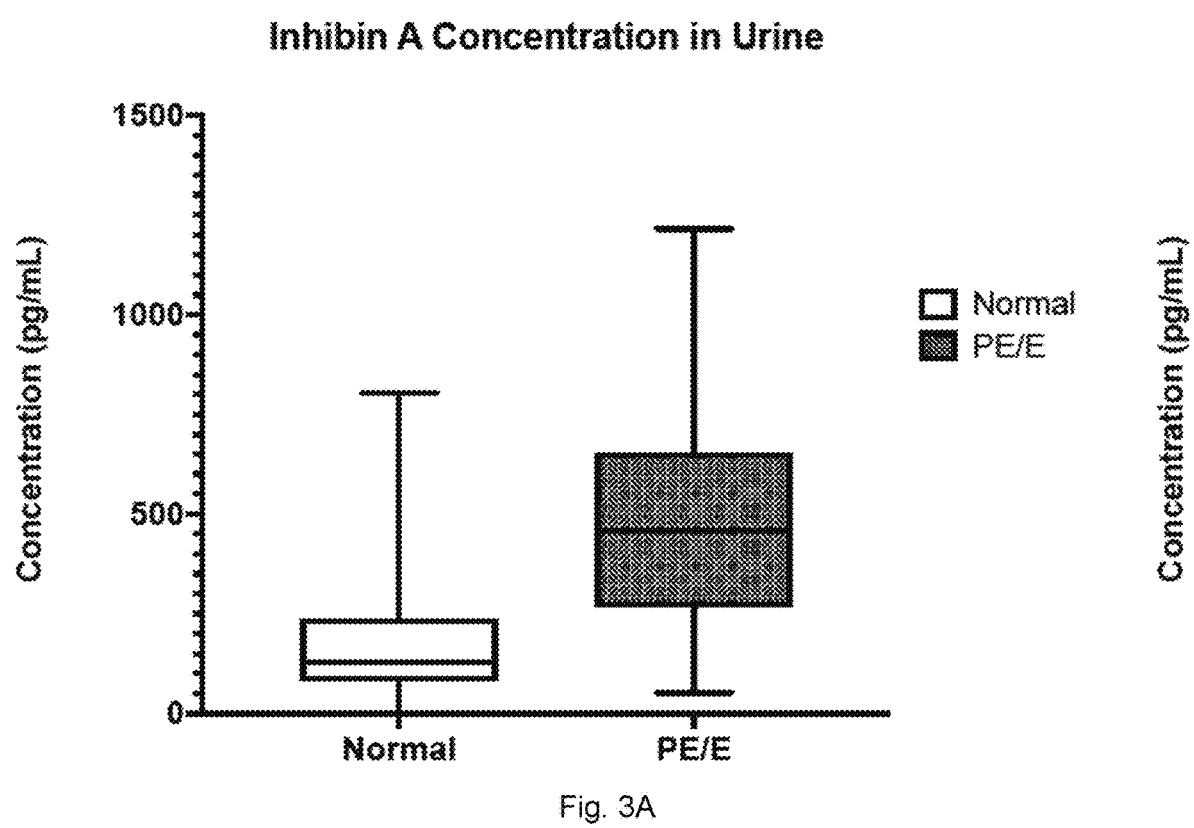
FIGS. 3A-3C are graphical depictions of the data from studies evaluating the concentration of inhibin A in normal versus preeclamptic/eclamptic women (FIGS. 3A and 3B), and the ROC curve of inhibin A for determination of a diagnostic range (FIG. 3C).
Figure 3B:
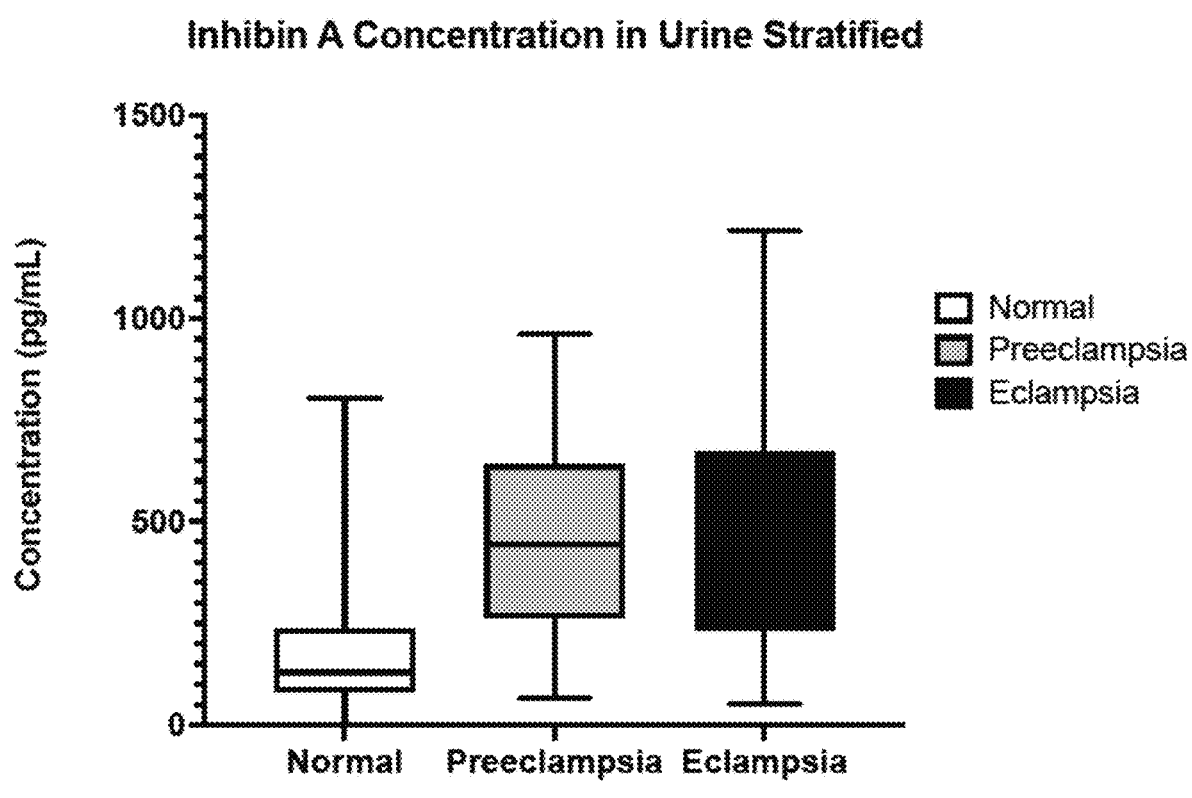

Inhibin A results were similar to activin A in that a statistically significant difference was found between the case and control groups as shown in FIG. 3A and Table 4. Moreover, FIG. 3B and Table 5 shows the stratification of the case group, the concentration values between PE/E were not statistically different and the range of concentrations was more similar.

TABLE 4

| Clinical Diagnosis | Average Concentration of Inhibin A (pg/mL) |
| --- | --- |
| Control (Normal Pregnancy) | 189.13 |
| Case (Preeclampsia/Eclampsia) | 467.00 |

TABLE 5

| Clinical Diagnosis | Average Concentration of Inhibin A (pg/mL) |
| --- | --- |
| Normal Pregnancy | 189.13 |
| Preeclampsia | 450.98 |
| Eclampsia | 515.05 |

Figure 3C:
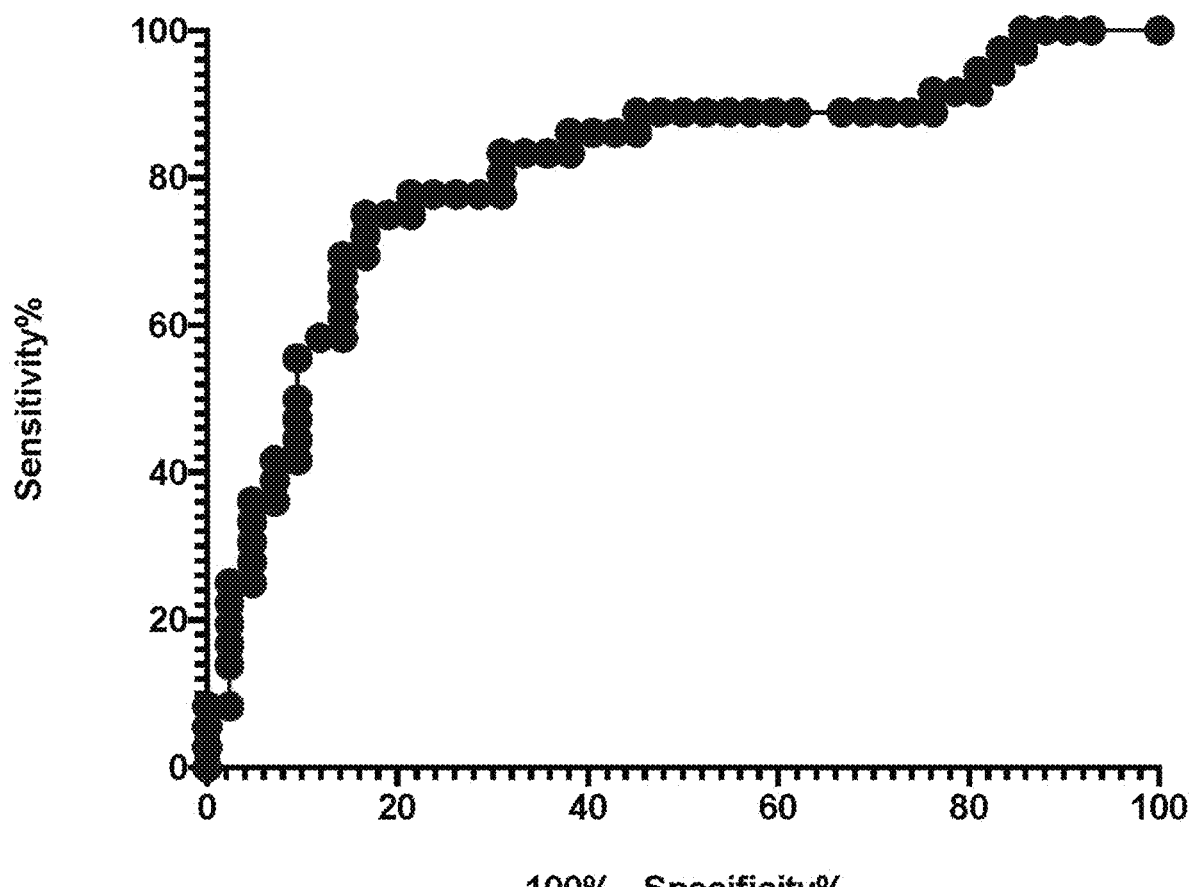
Figure 4:
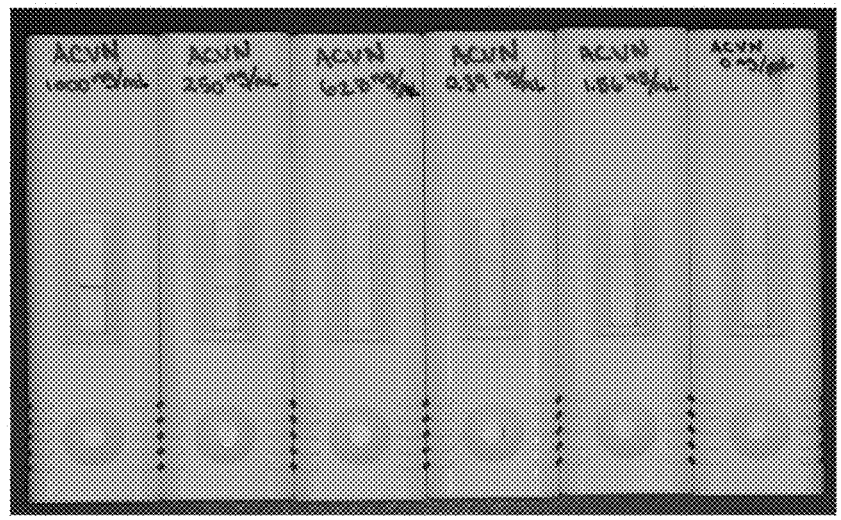
FIG. 4 is an image of activin A full test results using diagnostic assays as disclosed herein, with the lateral-flow immunoassay (LFA) tests shown in the image and summarized in the table below.
Figure 4:
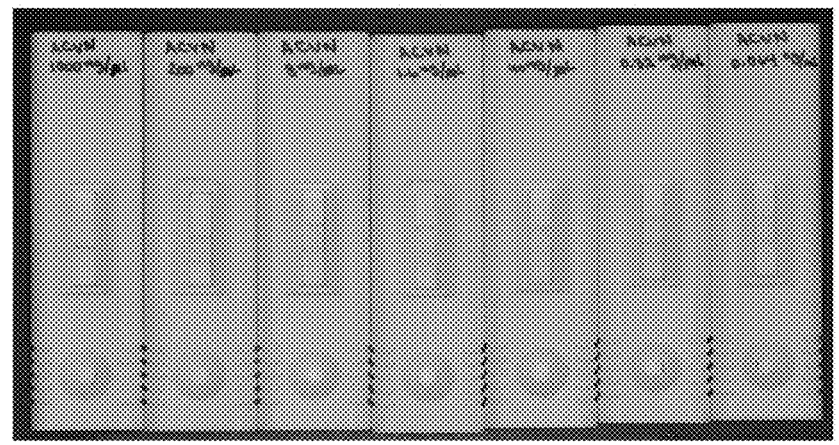
Figure 5:
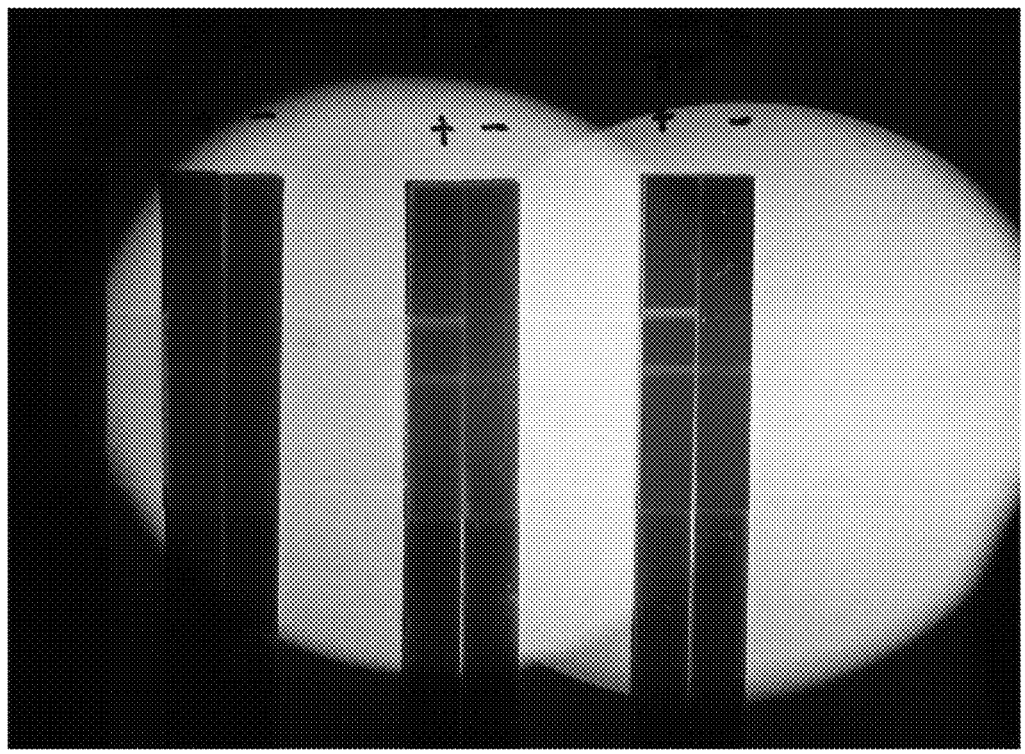
FIG. 5 is an image showing that activin A can be detected using a fluorescent label.
Figure 6:
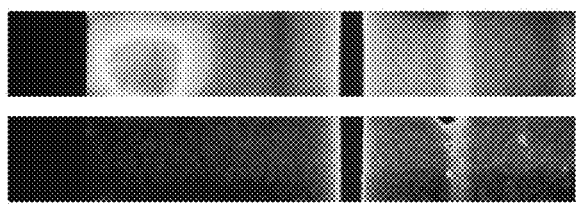
FIG. 6 includes images of LFA image interpolation of activin A and inhibin A positive and negative results.
Figure 6:
Figure 6:
Figure 6:

The ROC curve was again plotted as the concertation of inhibin A in urine varies. This data establishes that a diagnostic range can be determined. See Table 6 and FIG. 3C.

TABLE 6

| Threshold Concentration (pg/mL) | Sensitivity % | Specificity % |
| --- | --- | --- |
| >46.50 | 100 | 14.29 |
| >228.7 | 77.78 | 71.83 |
| >416.9 | 55.56 | 90.48 |

Example 4

Preparation of Biotinylated Reagents

Experiments were conducted to optimally biotinylate reagents at 20:1 molar ratios. The materials and equipment used, as well as methods employed, are described and summarized below in Tables 7-9.

TABLE 7

| Materials and Equipment: | |
| --- | --- |
| Description | Lot No. |
| Anti-Inhibin (Abbexa, INHA Antibody abx109909 at 3 mg/mL) - Rabbit Ab | LAB1811N611 |
| Anti-Activin (Abbexa, ACVA Antibody abx129133 at 1 mg/mL) - Rabbit Ab | LAB1811Q012 |
| Anti-hCG beta (Medix Biochemica, Anti-hCG beta 5011 SPRN-1 at 1.06 mg/mL) - Mouse Ab | 0038264 |
| 0.5 mL 30k MWCO Filters (Amicon UFC503096) | |
| NHS-dPEG12-biotin, 10 mM in DMSO | 588-069 |
| 1X PBS | 24JAN2018KC |
| Zeba 0.5 mL Desalting Column, 7k MWCO, PN 89882 | SJ258880 |

TABLE 7-continued

Materials and Equipment:

| Description | Lot No. |
|---|---|
| Vortex | N/A |
| Beckman Coulter Spec, DU730, SP002 | 1304273 |

Method:

Exchanged 150 uL of each antibody stock into 1×PBS via Amicon Filter units to remove azide and glycerol (3×500 uL exchanges per Amicon instructions for use).
Anti-Inhibin A280=3.55/1.4 OD/mg/mL=2.61 mg/mL
Anti-Activin A280=1.09/1.4 OD/mg/mL=2.61 mg/mL
Combine calculated amount of protein, 500 mM Phosphate, and 10 mM NHS-Peg12-biotin solution according to the table below:

TABLE 8

| Protein | concentration (mg/mL) | Ratio (biotin:Protein) | Mass antigen (mg) | vol antigen (mL) | MW antigen* | mol antigen | mol biotin needed | vol 10 mM biotin (uL) | Vol 1X PBS (mL) |
|---|---|---|---|---|---|---|---|---|---|
| Anti-Inhibin (Abbexa, INHA Antibody abx109909 | 2.61 | 20:1 | 0.05 | 0.0192 | 150000 | 3.33.E−10 | 6.66.E−09 | 6.66.E−01 | 0.05 |
| Anti-Activin (Abbexa, ACVA Antibody abx129133 | 0.78 | 20:1 | 0.025 | 0.032 | 150000 | 1.65.E−10 | 3.33.E−09 | 3.33.E−01 | 0.05 |
| Anti-hCG beta (Medix Anti-hCG beta 5011 SPRN- | 0.77 | 20:1 | 0.05 | 0.065 | 150000 | 3.33.E−10 | 6.66.E−09 | 6.66.E−01 | 0.02 |

Vortex conjugates.
Incubate for overnight at 4° C.
Purify using Zeba Spin columns following the package insert, washing through with 1×PBS. If volume is less than 70 uL, use a stacker of 1×PBS during the final wash-through.
Check the final concentration of biotinylated antibodies using the 10-cap, blanking with 1×PBS.

TABLE 9

| Protein | A280 | mg/mL | [M] |
|---|---|---|---|
| Anti-Inhibin (Abbexa, INHA Antibody abx109909 | 1.35 | 0.96 | 6.40E−06 |
| Anti-Activin (Abbexa, ACVA Antibody abx129133 | 0.56 | 0.4 | 2.70E−06 |
| Anti-hCG beta (Medix Anti-hCG beta 5011 SPRN- | 1.12 | 0.8 | 5.30E−06 |

Example 5

Preparation of Cellulose Nanobeads (CNB) Conjugates

Experiments were conducted to conjugate various antibodies to R2 CNB at 1:10 ratio. The materials and equipment used, as well as methods employed, are described and summarized below in Table 10.

TABLE 10

Materials and Equipment:

| Description | Lot No. |
|---|---|
| NanoAct R2 CNB 1% Stock PN: RE2DAA001 | RE2QAXRCV |
| Anti-Inhibin (Abbexa, INHA Antibody abx109909 at 3 mg/mL) - Rabbit Ab | LAB1811N611 |
| Anti-Activin (Abbexa, ACVA Antibody abx129133 at 1 mg/mL) - Rabbit Ab | LAB1811Q012 |
| Anti-hCG beta (Medix Biochemica, Anti-hCG beta 5011 SPRN-1 at 1.06 mg/mL) - Mouse Ab | 0038264 |
| CNB Blocking Buffer PN: 10052 | W18-279 |
| CNB Wash/Storage Buffer PN: 10049 | W18-235 |
| 20 mM Sodium Phosphate pH 7.0 | 688-087 |
| Qsonica Sonicator, Q55 | SN003 |
| Incubator with Rotator | OV010 |
| Force Air Oven @ 40° C. 1370FM | OV006 |

TABLE 10-continued

Materials and Equipment:

| Description | Lot No. |
|---|---|
| Scilogex Micro Plate Mixer | 82200004SX |
| Rotator | N/A |
| Beckman Coulter Spec, DU730 | SP002 |
| Thermo Scientific Centrifuge, Legend XTR | CE004 |

Example 6

Conjugating Rabbit Antibodies to Colloidal Gold

Experiments were conducted to load rabbit antibodies onto colloidal gold at pH 8 and 10 ug/mL, and to block rabbit antibody conjugates with a casein-based block buffer. The materials and equipment used, as well as methods employed, are described and summarized below in Tables 11-13.

TABLE 11

Materials and Equipment:

| Description | Lot No. |
|---|---|
| DCN 40 nm gold, PN CG-010 | W17-345-2 |
| 0.2M potassium carbonate, PN 10020 | W18-320 |
| 1X PBS | — |
| 0.1M borate, pH 8.0, PN 10061 | W18-234 |
| 1% 7 day-cured casein | 703-063 |
| Beckman Coulter Spectrophotometer, DU730 | SP002 |
| Thermo Scientific Centrifuge, Legend XTR | CE004 |
| Anti-Inhibin (Abbexa, INHA Antibody | LAB1811N611 |

TABLE 11-continued

Materials and Equipment:

| Description | Lot No. |
|---|---|
| abx109909 at 3 mg/mL) - Rabbit Ab Anti-Activin (Abbexa, ACVA Antibody abx129133 at 1 mg/mL) - Rabbit Ab | LAB1811Q012 |
| Anti-hCG beta (Medix Biochemica, Anti-hCG beta 5011 SPRN-1 at 1.06 mg/mL) - Mouse Ab | 0038264 |

Method:
Conjugating Colloidal Gold by Passive Adsorption
1. Obtain 30 mL of 40 nm Au, stir continuously on a stir plate to evaluate pH during titration process. Allow to come to room temperature.
2. Add 0.2 M potassium carbonate to arrive at a final gold pH of 8.0.
3. Calculate the amount of each of the three antibodies needed to bring effective antibody concentration to 10 ug/mL in 5 to 10 mL of buffered gold (Table 12):

TABLE 12

| Antibody | [Antibody] (mg/mL) | V desired (mL) | [Ab] desired (mg/mL) | V Ab to use (uL) |
|---|---|---|---|---|
| Anti-Inhibin Exchanged via Zeba, assume still 3 mg/mL | 3 | 10 | 0.1 | 33 |
| Anti-Activin Exchanged via Zeba, (A280 = 0.38 = 0.27 mg/mL) | 0.27 | 5 | 0.05 | 185 |
| Anti-hCG Exchanged via Zeba, (A280 = 1.08 = 0.77 mg/mL) | 0.77 | 10 | 0.1 | 130 |

4. Add the specified amount of the antibody desired amount of buffered colloidal gold into the tube and immediately mix.
5. Incubate at room temperature for 15 minutes.

Blocking and Washing Colloidal Gold Conjugates
6. Add 1% casein to final concentration of 0.1% into the rabbit antibody conjugate solution. Vortex to mix.
7. Incubate at room temperature for 30 minutes.
8. Prepare a casein-based conjugate diluent of 50 mM 0.1% casein by combining 2 mL of 1% casein with 10 mL of 0.1 M borate and 8 mL DI water.
9. Centrifuge all conjugate at 14000×g for 20 minutes at 4° C. (acceleration and deceleration set to 9).
10. Remove supernatant by suction.
11. Resuspend pellet to approximate OD 10 in casein based conjugate diluent.
12. Transfer to 1.5 mL tubes.
13. Centrifuge conjugate at 14000×g for 20 minutes at 4° C.
14. Remove supernatant.
15. Resuspend pellet to approximate OD 10 in casein based conjugate diluent.
16. Vortex to resuspend gold particles.
17. Measure final OD.

OD measurement
18. Blank spectrophotometer with 990 uL of casein-based conjugate diluent.
19. Add 10 uL of the conjugate to be measured (1:100 dilution) and mix well.
20. Record OD at 540 nm and calculate the final conjugate concentration (Table 13).

TABLE 13

| Antibody | A540 nm | Final OD (A540 × 100) |
|---|---|---|
| Anti-Inhibin Exchanged via Zeba, assume still 3 mg/mL | 0.211 | 21.1 |
| Anti-Activin Exchanged via Zeba, (A280 = 0.38 = 0.27 mg/mL) | 0.195 | 19.5 |
| Anti-hCG Exchanged via Zeba, (A280 = 1.08 = 0.77 mg/mL) | 0.205 | 20.5 |

Example 7

Preparation of Europium (Eu) Latex Conjugates

Experiments were conducted to prepare Europium Latex Conjugates. The materials and equipment used, as well as methods employed, are described and summarized below in Tables 14-19.

TABLE 14

Materials and Equipment:

| Description | Lot No. |
|---|---|
| Eu Latex, 0.2 um, Thermo 9347052001050 | 603782 |
| 0.1M MES pH 6.0 DCN PN 10060 | W18-272 |
| 50 mM Borate Buffer pH 8 (prepared from PN 10061) | |
| 6% Casein in 50 mM Tris pH 8.5, 7-day cure | |
| EDC - Thermo/Pierce #22980 | |
| NHS | |
| 1M Ethanolamine (prepared from TCI A0297) | 4JHGA |
| Anti-Inhibin (Abbexa, INHA Antibody abx109909 at 3 mg/mL) - Rabbit Ab | LAB1811N611 |
| Anti-Activin (Abbexa, ACVA Antibody abx129133 at 1 mg/mL) - Rabbit Ab | LAB1811Q012 |
| 0.5 mL 30k MWCO Filters (Amicon UFC503096) | |

Method:
Exchanged 150 uL of each antibody stock into 1×PBS via Amicon Filter units to remove azide and glycerol (3×500 uL exchanges per Amicon instructions for use).
Anti-Inhibin A280=3.55/1.4 OD/mg/mL=2.61 mg/mL
Anti-Activin A280=1.09/1.4 OD/mg/mL=0.78 mg/mL
1. Gently rotate stock latex for 10 minutes.
2. Sonicate the stock latex using a microtip sonicator (setting 25) for 10-15 seconds.
3. Dilute 10% stock latex to 1% in 0.1M MES pH 6.5—stock already at 1%.

TABLE 15

| Total Vol Latex to Conjugate (ul) | Latex Concentration (% Solids) | Latex Stock (ul) | 0.1M MES (ul) |
|---|---|---|---|
| 200 | 1 | 200 | 0 |

4. Microfuge for 8 min @ 15000 g.
5. Remove supernatant and resuspend pellet in 0.1M MES pH 6.5 (Vol. of buffer is equal to starting Vol. of Latex).

6. Sonicate briefly to resuspend latex (Setting 25) for 5 seconds.
7. Microfuge the sample preps for 8 min @ 15000 g.
8. After microfuge of sample resuspend in 0.1 MES Buffer (see table below for volume).
9. Sonicate briefly to resuspend latex (Setting 25) for 5 seconds.
Perform quick spin to clean latex from tube cap.

TABLE 16

| 0.1M MES for resuspension | EDC (ul) | sulfo-NHS (ul) |
|---|---|---|
| 148 | 12 | 40 |

10. Prepare 15 mg/ml EDC in 0.1M MES Buffer (60 μL needed per 1 mL prep).
    a) bring EDC to room temperature before weighing out
    b) weigh out EDC directly in glass or polypropylene tube
    c) EDC sample must be added to sample prep within 10 minutes of preparation
    d) tock powder must be desiccated and frozen (−20° C.) for long term storage

TABLE 17

| mg EDC | mL of 0.1M MES Buffer for resuspension |
|---|---|
| 7 | 0.467 |

11. Prepare 50 mg/ml NHS in 0.1M MES Buffer (200 μL needed per 1 mL prep).
    a) bring NHS to room temperature before weighing out
    b) weigh out NHS directly in glass or polypropylene tube
    c) NHS must be added to sample prep within 10 minutes of preparation
    d) NHS takes more time to go into solution than EDC
    Note: The EDC and NHS addition is the critical step for activating the latex and puts you on the clock.

TABLE 18

| mg NHS | mL of 0.1M MES Buffer for resuspension |
|---|---|
| 21 | 0.42 |

12. Add in NHS first, then add in EDC (see table above for volumes).

Note: for 1 mL latex prep resuspend with 740 ul MES, add 200 ul NHS and 60 ul EDC.

13. Activation Step: Incubate for 30 minutes on shaker at 1000 rpm.
*Note: 30 minutes incubation time is critical*

14. Calculations for ratio preps:
    1 mL of latex at 1%=10 mg latex→1%=1 g/100 mL
    1 g/100 mL=10,000 mg/1000 mL=(10 mg/mL)×(1 mL sample prep)=10 mg latex
    Note: Dilution factor is arbitrary but has worked historically, adjust accordingly
    a) 1:20=10 mg latex/20=0.5 mg Ab/Ag
    b) 1:40=10 mg latex/40=0.25 mg Ab/Ag (Use 1:40 ratio for normal conjugations)
    c) 1:60=10 mg latex/60=0.167 mg Ab/Ag
    Ab volume need=Ab quantity (mg)/Ab concentration (mg/mL)

15. Conjugation
    a) After 30 minute activation step, Microfuge preps for 8 min @ 15000 g.
    b) Resuspend pellet in 50 mM Borate Buffer, vortex and sonicate (vol. of buffer is equal to starting vol. of latex).
    c) Microfuge preps for 8 min @ 15000 g.
    d) Resuspend pellet using appropriate amount of 50 mM Borate Buffer (see table below), vortex and sonicate.
    e) Perform quick spin to clean latex from tube cap.

TABLE 19

| Ab. Being coupled | Lot | Ratio (Bead:Ab) | mg Latex | mg Ab | Stock Conc (mg/mL) | ul Ab | ul 50 mM Borate Buffer |
|---|---|---|---|---|---|---|---|
| Anti-Inhibin (Abbexa, INHA Antibody abx109909 at 3 mg/mL) - Rabbit Ab | LAB1811N611 | 20 | 1 | 0.05 | 2.61 | 19.2 | 45.8 |
| Anti-Activin (Abbexa, ACVA Antibody abx129133 at 1 mg/mL) - Rabbit Ab | LAB1811Q012 | 20 | 0.3 | 0.015 | 0.78 | 19.2 | — |

16. Incubate for 2 hours at RT on shaker at 1000 rpm
17. Add 1M Ethanolamine at 10 uL/mL and place back on shaker.
18. Incubate for 30 minutes at RT on shaker at 1000 rpm.
19. Microfuge for 8 min @ 15000 g.
20. Resuspend into 1% Casein 7-day cured and shake overnight at 1000 RPM.
21. After overnight incubation microfuge for 8 min @ 15000 g.
22. Resuspend into 1% casein 7-day cured, vortex and sonicate.
23. Repeat washes 2 more times (steps 21-22).
24. Store in 1% casein.

Example 8

Striping Anti-INHA, Anti-ACVA, and Anti-hCG Antibodies with Control Lines

Experiments were conducted to prepare materials for development of Activin, Inhibin, and a model hCG LFA. The materials and equipment used, as well as methods employed, are described and summarized below in Tables 20-22.

TABLE 20

Materials and Equipment:

| Description | Lot No. |
|---|---|
| Anti-Inhibin (Abbexa, INHA Antibody abx109909 at 3 mg/mL) - Rabbit Ab | LAB1811N611 |
| Anti-Activin (Abbexa, ACVA Antibody abx129133 at 1 mg/mL) - Rabbit Ab | LAB1811Q012 |
| Anti-hCG Alpha (Fitzgerald, hCG Alpha Antibody 70-XG35 at 8.16 mg/mL) - Mouse Ab | X14011604 |
| Goat Anti-Rabbit (Lampire, 7455607 at 10 mg/mL) | 16L40044 |
| Goat Anti-Mouse (Lampire, 7455507 at 10 mg/mL) | 18B51008 |
| Water | |
| Bioterge | |
| UniStart CN140 Membrane | |
| 1X PBS | 03DEC2018SF |

Method:
1. Prepare striping solutions Anti-Inhibin, Anti-Activin, and Anti-hCG at 1 mg/mL in 1×PBS.
2. Prepare anti-Rabbit and anti-Mouse (Control lines) at 0.5 mg/mL in 1×PBS.

TABLE 21

| Antibody | Lot | Desired Volume (uL) | Desired Conc (mg/mL) | Stock Conc (mg/mL) | Stock volume (uL) | 1X PBS (uL) |
|---|---|---|---|---|---|---|
| Anti-Inhibin (Abbexa, INHA Antibody abx109909 at 3 mg/mL) - Rabbit Ab | LAB1811N611 | 150 | 1 | 3 | 50 | 100 |
| Anti-Activin (Abbexa, ACVA Antibody abx129133 at 1 mg/mL) - Rabbit Ab | LAB1811Q012 | 150 | 1 | 1 | 150 | 0 |
| Anti-hCG Alpha (Fitzgerald, hCG Alpha Antibody 70-XG35 at 8.16 mg/mL) - Mouse Ab | X14011604 | 100 | 1 | 8.16 | 12.3 | 87.7 |
| Goat Anti-Rabbit (Lampire, 7455607 at 10 mg/mL) | 16L40044 | 500 | 0.5 | 10 | 25 | 475 |
| Goat Anti-Mouse (Lampire, 7455507 at 10 mg/mL) | 18B51008 | 200 | 0.5 | 10 | 10 | 190 |

Note:
A280 Anti-Inhibin = 7.98 after buffer exchange via Zeba column. Assumed concentration of exchanged solution is 3 mg/mL per product label. A280 Anti-Activin = 0.38 = 0.27 mg/mL, much lower than expected. Additional spins did not recover additional Ab. Unexchanged Stock antibody had OD near expected 1.4. Exchanged antibody was striped at this 0.27 mg/mL concentration.

3. Wash front lines with 10 cycles of 0.05% Bioterge and diH$_2$O.
4. Align frontlines from the bottom of the membrane for the test and control line.
   a. 10 mm and 14 mm
5. Empty frontlines and prime in test and control line reagents into the frontlines.
6. Stripe CN95 membranes.
   a. Start with lowest concentration of test line first.
   b. Striping Parameters to be used
      i. Patterns>Edit>Frontline

TABLE 22

| Parameter | Value/Condition | Alteration |
|---|---|---|
| Program Parameters | | |
| Pattern | FRONTLINE | |
| Active | YES | |
| Shape | LINE | |
| Z-Enabled | YES | |
| Length (mm) | 250 | 300 |
| Polarization | YES | |
| Speed (mm/s) | 35.0 | 30 |
| ACC (mm/s$^2$) | 1000 | |
| X Start (mm) | 0 | |
| Y Start (mm)* | 6.5 | 20 |
| Z Up (mm) | 0 | |
| Z Down (mm) | 52.0 | 54.0 |
| Repeat 1 | 0 | |
| BIOJETQUANTI 1 (Test Line) | | |
| Active | YES | |
| Rate (µL/cm) | 1.000 | |
| Drop (nL) | 42.0 | |
| Pitch (mm) | 0.425 | |
| ON-TIME (ms) | 0.30 | |
| Fill Volume (µL) | 31 | |
| BIOJETQUANTI 2 (Control Line) | | |
| Active | YES | |
| Rate (µL/cm) | 1.000 | |
| Drop (nL) | 42.0 | |
| Pitch (mm) | 0.425 | |

TABLE 22-continued

| Parameter | Value/Condition | Alteration |
|---|---|---|
| ON-TIME (ms) | 0.30 | |
| Fill Volume (µL) | 31 | |

*changed depending on the tube length

7. Label and dry membranes at 40° C. for 30 minutes.
8. Once striping is completed Wash frontlines with 10 cycles of 0.05% Bioterge and diH$_2$O.

Conclusion:

Membranes labeled accordingly:
1. 5 membranes of Anti-Inhibin test line and anti-Rabbit control line at 10 and 14 mm, respectively.
2. 5 membranes of Anti-Activin test line (0.27 mg/mL) and anti-Rabbit control line at 10 and 14 mm, respectively; Zeba exchanged anti-Activin from 1st day.
3. 2 membranes of anti-hCG test line and anti-Mouse control line at 10 and 14 mm, respectively.
4. 2 membranes of Anti-Activin test line (0.78 mg/mL) and anti-Rabbit control line at 10 and 14 mm, respectively; Amicon exchanged anti-Activin prepared 2$^{nd}$ day.

Store membranes in a foil pouch containing desiccant.

Example 9

Determining Limit of Detection

Experiments were conducted to determine the limits of detection (LOD) for the disclosed diagnostic and/or screening test for preeclampsia (PE). Results demonstrated that significant increases to the LOD could be achieved by combining one or more aspects of the run buffer, the labeling of antibodies for detection and the conjugation pad (faster or slower run depending on density of fibers). See below Tables 23-25, and Figure

TABLE 23

Activin A- Gold nanoparticles (no run buffer)

Test Strip Specs
Au-ACV

1 µL Bio-ACV
5 µL sample
15 µL urine

| Strip Label (letter) | Activin Concentration (ng/mL) | Visible Test Signal | Visible Control Signal |
|---|---|---|---|
| A | 1000 | yes | yes |
| B | 200 | yes | yes |
| C | 40 | no | no |
| D | 8 | yes | yes |
| E | 1.6 | no | no |
| F | 0.32 | no | no |
| G | 0.064 | no | no |
| 0 | 0 | no | no |

*Cutoff = 8 ng/mL

TABLE 24

Activin A- Cellulose nanobeads

| Test Strip Specs CNB-ACV | Test Invalid |
|---|---|

1 µL Bio-ACV
5 µL sample
15 µL urine

| Strip Label (letter) | Activin Concentration (ng/mL) | Visible Test Signal | Visible Control Signal |
|---|---|---|---|
| A | 1000 | yes | no |
| B | 200 | yes | yes-negative line |
| C | 40 | yes | yes-negative line |

TABLE 24-continued

Activin A- Cellulose nanobeads

| D | 8 | yes | yes-negative line |
|---|---|---|---|
| E | 1.6 | yes | yes-negative line |
| F | 0.32 | yes | yes-negative line |
| G | 0.064 | yes | yes-negative line |
| 0 | 0 | no | yes-negative line |

*Cutoff = .064 ng/mL

TABLE 25

Activin A- Gold nanoparticles

Test Strip Specs (ng/mL)
Au-ACV

1 µL Bio-ACV
5 µL sample
10 µL buffer
40 µL urine

| Strip Label (letter) | Activin Concentration | Visible Test Signal | Visible Control Signal |
|---|---|---|---|
| A | 1000 | yes | yes |
| B | 200 | yes | yes |
| C | 40 | yes | yes |
| D | 8 | yes | yes |
| E | 1.6 | yes | yes |
| F | 0.32 | yes | yes |
| G | 0.064 | yes | yes |
| 0 | 0 | no | yes |

*Limit of Detection = Cutoff = .064 ng/mL = 64 pg/mL, Test Valid

In some aspects, the run buffer used for optimal visualization included 1 ml casein, 100 ul tween. Other buffers tested included the following:

Run buffer 3=1×PBS, 0.1% tween, 0.1% casein
Run buffer 4=1% tween, 1% casein, 150 mM NaCl
Run buffer 5=1% tween, 1% casein, 300 mM NaCl The results presented herein demonstrate that the disclosed diagnostic and/or screening test for preeclampsia can detect concentrations of the target biomarker down to 64 pg/mL for activin A and inhibin A visually (no reader needed) from fresh urine sample. In some embodiments, the LOD of visual readout assays using the diagnostic and/or screening test for preeclampsia herein was 64 pg/mL or 2.44 pM (using estimated molecular weight 26.2 kDa) using both colloidal gold and cellulose nanobeads. The ability to effectively and accurately detect such low levels of activin A and/or inhibin A, for the purpose of diagnosing and/or screening for PE, is a significant advancement over existing methods and systems.

Example 10

Testing Combinations of Biomarkers for PE on LFA

Experiments were conducted to ascertain the effectiveness of combining more than one biomarker on and/or in the diagnostic and/or screening tests for preeclampsia. In some embodiments the disclosed and diagnostic screening tests were configured to screen for or detect both activin A and inhibin A in the same test format. From these experiments two outcomes were achieved.

First, for embodiments favoring sensitivity of the diagnosis and/or screening the following were approaches were developed:

rule patients in (positive diagnosis) if either activin A or inhibin A are above their respective threshold values (75 ng/mL and 200 ng/mL).

rule patients out (negative test) only if both activin A and inhibin A were below their thresholds The sensitivity of such an approach was determined to be about 94.7%, with the specificity about 54.06%.

Second, for embodiments favoring specificity of the diagnosis and/or screening the following were approaches were developed:

rule patients out (negative diagnoses) if either activin A or inhibin A are below their respective thresholds.

rule patient in (positive test) if both activin A and inhibin A are above their thresholds The sensitivity of such an approach was determined to be about 61.76%, with the specificity about 92.11%.

Discussion of Examples 1-10

As the results herein demonstrate, activin A and inhibin A were both present in the target population. Activin A and inhibin A had significant differences in concentration levels between case (preeclampsia/eclampsia) and control (normal pregnancy) groups, indicating their potential for diagnostic use.

In addition to individual biomarker analyses, sensitivity and specificity analyses were conducted for a combined biomarker diagnostic using both activin A and inhibin A, as set forth in Example 10 above. The data demonstrate that in some embodiments testing or screening for both inhibin A an activin A can be advantageous.

Despite several years of research in the field, a single test accurate enough to provide a screening tool for pre-eclampsia has not yet been found [11, 12]. Review of different biochemical markers for pre-eclampsia before the 25th week of gestation in cohort and case control studies revealed no test with a sensitivity and specificity over 90% [13] However to improve the predictive value, a combination of biomarkers may achieve improved accuracy. This long-felt need has been fulfilled as disclosed herein, where, in some embodiments, the combination of activin A and inhibin A provides specificity of about 95% and sensitivity of about 60% for inhibin A, and specificity of about 89% and sensitivity of about 70% for inhibin A for urinary levels of these proteins in the third trimester.

REFERENCES

All references listed herein including but not limited to all patents, patent applications and publications thereof, scientific journal articles, and database entries are incorporated herein by reference in their entireties to the extent that they supplement, explain, provide a background for, or teach methodology, techniques, and/or compositions employed herein.

1 World Health Organization, *Maternal Mortality: Fact Sheet*. 2016.
2 WHO. (November 18). *Maternal mortality*. Vol. 2015 SRC—Google Scholar. 2016.
3 Foundation, P. *Preeclampsia and Maternal Mortality: a Global Burden*. 2013 2013-05-01;
4 Wu, Pensée, et al. "Early pregnancy biomarkers in preeclampsia: a systematic review and meta-analysis." International journal of molecular sciences 16.9 (2015): 23035-23056.
5 Massagué, J., *TGF-β signal transduction*. Annual review of biochemistry, 1998. 67 (1): p. 753-791.
6 Wozney, J. M., et al., *Novel regulators of bone formation: molecular clones and activities*. Science, 1988. 242 (4885): p. 1528-1534.
7 Schier, A. F. and M. M. Shen, *Nodal signalling in vertebrate development*. Nature, 2000. 403 (6768): p. 385-389.
8 Gray, P. C., et al., *Activins and inhibins: Physiological roles, signaling mechanisms and regulation*, in *Hormones and the Brain*. 2005, Springer. p. 1-28.
9 Ying, S.-Y., *Inhibins, activins, and follistatins: gonadal proteins modulating the secretion of follicle-stimulating hormone*. Endocrine Reviews, 1988. 9 (2): p. 267-293.
10 De Kretser, D., et al., *Inhibins, activins and follistatin in reproduction*. Human reproduction update, 2002. 8 (6): p. 529-541.
11 Conde-Agudelo, A., J. Villar, and M. Lindheimer, *World Health Organization systematic review of screening tests for preeclampsia*. Obstetrics & Gynecology, 2004. 104 (6): p. 1367-1391.
12 Kuc, S., et al., *Evaluation of 7 serum biomarkers and uterine artery Doppler ultrasound for first-trimester prediction of preeclampsia: a systematic review*. Obstetrical & gynecological survey, 2011. 66 (4): p. 225-239.
13 Cnossen, J. S., et al., *Are tests for predicting preeclampsia good enough to make screening viable? A review of reviews and critical appraisal*. Acta obstetricia et gynecologica Scandinavica, 2009. 88 (7): p. 758-765.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A diagnostic and/or screening test for preeclampsia (PE), the diagnostic and/or screening test comprising:
   a test antibody with an affinity to activin A and inhibin A;
   a control antibody; and
   a detectable moiety configured to be detectable when activin A and inhibin A is present at a threshold concentration in a sample,
   wherein the threshold concentration of activin A is greater than about 0.064-0.435 ng/ml and the threshold concentration of inhibin A is greater than about 0.064-0.417 ng/ml,
   wherein the diagnostic and/or screening test is configured in a lateral-flow immunoassay format, and
   wherein the diagnostic and/or screening test detects the threshold concentration of activin A and the threshold concentration of inhibin A simultaneously in a sample, with a specificity of about 80% to about 95% and a sensitivity of about 50% to about 60% for activin A, and a specificity of about 70% to about 89% and a sensitivity of about 60% to about 70% for inhibin A.

2. The diagnostic and/or screening test for preeclampsia of claim 1, wherein the diagnostic and/or screening comprises test antibodies for both activin A and inhibin A.

3. The diagnostic and/or screening test for preeclampsia of claim 1, wherein the diagnostic and/or screening test further detects placental growth factor (PIGF).

4. The diagnostic and/or screening test for preeclampsia of claim 1, wherein the diagnostic and/or screening test is configured as a point-of-care diagnostic and/or screening test.

5. The diagnostic and/or screening test for preeclampsia of claim 1, wherein the sample is a urine sample from a human subject.

6. A diagnostic and/or screening apparatus for preeclampsia, the diagnostic and/or screening apparatus comprising:
a chromatography matrix;
a first detection antibody with binding affinity to activin A and a second antibody with binding affinity to inhibin A, or a third antibody with binding affinity to activin A and inhibin A, the detection antibodies configured to diagnose and/or screen for preeclampsia when activin A and inhibin A are present at a threshold concentration in a sample from a subject;
a detectable marker conjugated to the first and second, or third detection antibody; and
a first capture antibody with binding affinity to activin A, and a second capture antibody with binding affinity to inhibin A, or a third capture antibody with binding affinity to activin A and inhibin A,
wherein the diagnostic and/or screening apparatus is configured as a lateral-flow immunoassay,
wherein the threshold concentration of activin A is greater than about 0.064-0.435 ng/ml and the threshold concentration of inhibin A is greater than about 0.064-0.417 ng/ml,
wherein the diagnostic and/or screening test detects the threshold concentration of activin A and the threshold concentration of inhibin A simultaneously in a sample with a specificity of about 75% or greater and a sensitivity of about 50% or greater.

7. The diagnostic and/or screening apparatus of claim 6, wherein the detection antibodies have a binding affinity to activin A and inhibin A, and the capture antibodies have a binding affinity to activin A and inhibin A.

8. The diagnostic and/or screening apparatus of claim 6, wherein at least one of the detectable markers comprises an enzyme label, a fluorescent label, a radiolabel, a particulate label, colored latex particles, colored plastic particles, phosphor particles, colloidal gold nanoparticles, or a monodisperse latex combined with a detector reagent selected from colored dyes, fluorescent dyes, magnetic components, or paramagnetic components.

9. The diagnostic and/or screening apparatus of claim 6, wherein the diagnostic and/or screening apparatus detects the threshold concentration of activin A and the threshold concentration of inhibin A simultaneously in a sample, with a specificity of about 80% to about 95% and sensitivity of about 50% to about 60% for activin A, and specificity of about 75% to about 89% and sensitivity of about 60% to about 70% for inhibin A.

10. The diagnostic and/or screening apparatus of claim 6, wherein the diagnostic and/or screening apparatus is configured to further detect placental growth factor (PlGF).

11. The diagnostic and/or screening apparatus for preeclampsia of claim 6 wherein the diagnostic and/or screening apparatus provides a binary output.

12. The diagnostic and screening apparatus for preeclampsia of claim 11 wherein the binary output is determined using a threshold concentration for activin A and/or inhibin A.

13. A point-of-care (POC) immunoassay device comprising:
a chromatography matrix;
a sample pad;
a conjugate pad;
a detection antibody with binding affinity to activin A and inhibin A;
a detectable marker conjugated to the detection antibody;
one or more capture antibodies, wherein the capture antibodies have a binding affinity to activin A and inhibin A; and
a wicking pad,
wherein the POC immunoassay is configured as a lateral-flow immunoassay,
wherein the device is configured to detect activin A at a threshold concentration of greater than about 0.064-0.435 ng/ml and inhibin A at a threshold concentration of greater than about 0.064-0.417 ng/ml,
wherein the device detects the threshold of activin A and the threshold of inhibin A in a sample with a specificity of about 75% or greater and a sensitivity of about 50% or greater,
wherein the presence of the threshold concentration is used to diagnose or screen for preeclampsia in a point-of-care or in a field setting.

14. A lateral-flow immunoassay diagnostic and/or screening test for preeclampsia (PE), the diagnostic and/or screening test comprising:
a first test antibody with an affinity to activin A and a second test antibody with an affinity to inhibin A or a third antibody with an affinity to activin A and inhibin A;
a control antibody; and
a detectable moiety configured to be detectable when activin A and inhibin A are present at a threshold concentration in a sample,
wherein the threshold concentration of activin A is greater than about 0.064 ng/ml and the threshold concentration of inhibin A is greater than about 0.064 ng/ml,
wherein the device detects the threshold of activin A and the threshold of inhibin A in a sample with a specificity of about 75% or greater and a sensitivity of about 50% or greater.

* * * * *